United States Patent
Kono et al.

(10) Patent No.: US 10,113,607 B2
(45) Date of Patent: Oct. 30, 2018

(54) ACTIVE VIBRATION DAMPING DEVICE AND ACTIVE VIBRATION DAMPING METHOD

(71) Applicant: HONDA MOTOR CO., LTD., Minato-ku, Tokyo (JP)

(72) Inventors: Satoshi Kono, Wako (JP); Takashi Yamaguchi, Wako (JP); Hirotomi Nemoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/822,389

(22) Filed: Nov. 27, 2017

(65) Prior Publication Data

US 2018/0149230 A1   May 31, 2018

(30) Foreign Application Priority Data

Nov. 29, 2016   (JP) .................................. 2016-230754

(51) Int. Cl.
*G06F 7/00*   (2006.01)
*F16F 15/00*   (2006.01)

(52) U.S. Cl.
CPC .......... *F16F 15/002* (2013.01); *F16F 15/005* (2013.01)

(58) Field of Classification Search
USPC ......... 701/36; 327/72, 77; 372/38.01, 38.04, 372/46.01
See application file for complete search history.

(56) References Cited

U.S. PATENT DOCUMENTS

| 8,444,124 B2* | 5/2013 | Fueki | F16F 13/26 267/140.14 |
| 9,316,283 B2* | 4/2016 | Ladra | F16F 15/002 |
| 2010/0204881 A1* | 8/2010 | Muragishi | F16F 7/1005 701/36 |
| 2013/0166077 A1* | 6/2013 | Elliott | F16F 15/002 700/280 |
| 2014/0200792 A1 | 7/2014 | Yone et al. | |
| 2017/0293359 A1* | 10/2017 | Ikuta | G06F 3/016 |

FOREIGN PATENT DOCUMENTS

| JP | 08-177965 | 7/1996 |
| JP | 2011-252553 | 12/2011 |

* cited by examiner

*Primary Examiner* — Thomas G Black
*Assistant Examiner* — Luat T Huynh
(74) *Attorney, Agent, or Firm* — Amin, Turocy & Watson LLP

(57) ABSTRACT

A computer of an active vibration damping device calculates an output average duty ratio which is used for realizing operation command values. On the basis of the operation command values and an integer value point number, which is set so as to become larger as a period of rotation of the drive source becomes longer, the computer calculates a reference average duty ratio for realizing the operation command values when an actuator internal temperature is a reference temperature. The computer calculates the actuator internal temperature on the basis of a deviation between the output average duty ratio and the reference average duty ratio.

4 Claims, 22 Drawing Sheets

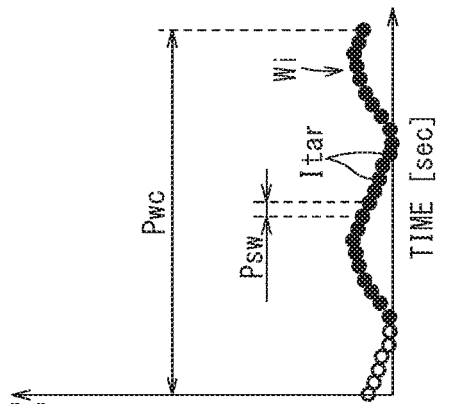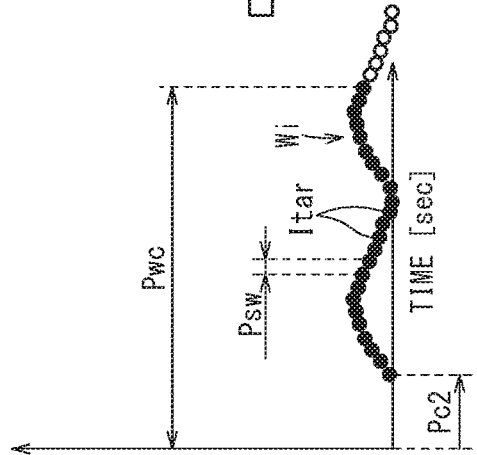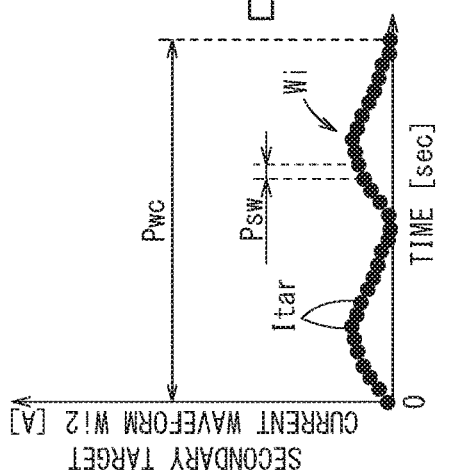

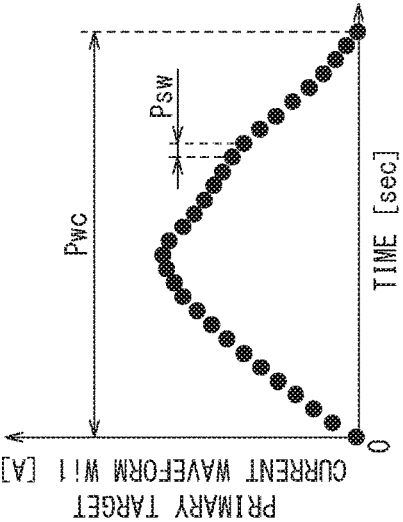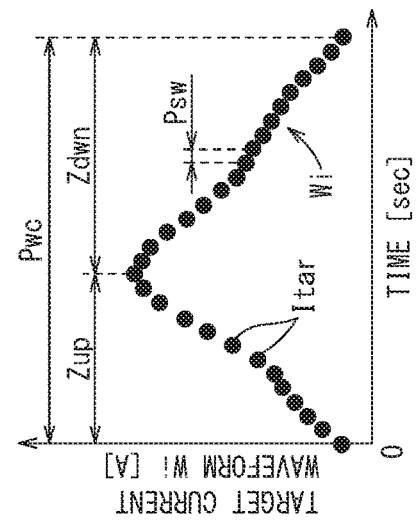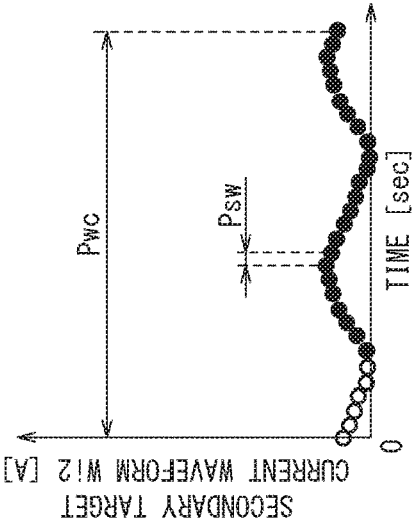
FIG. 11A
FIG. 11B
FIG. 11C

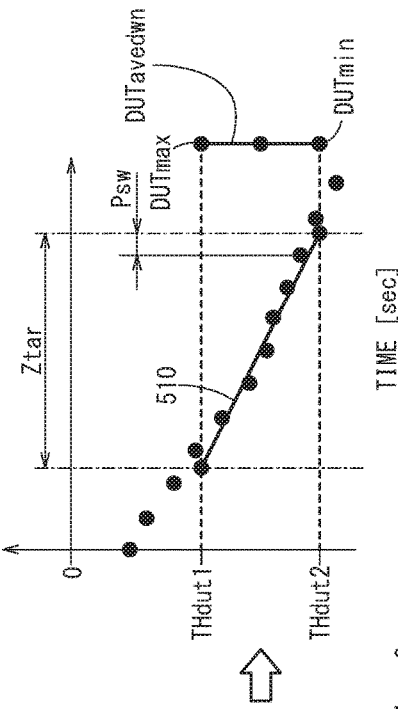
FIG. 18C
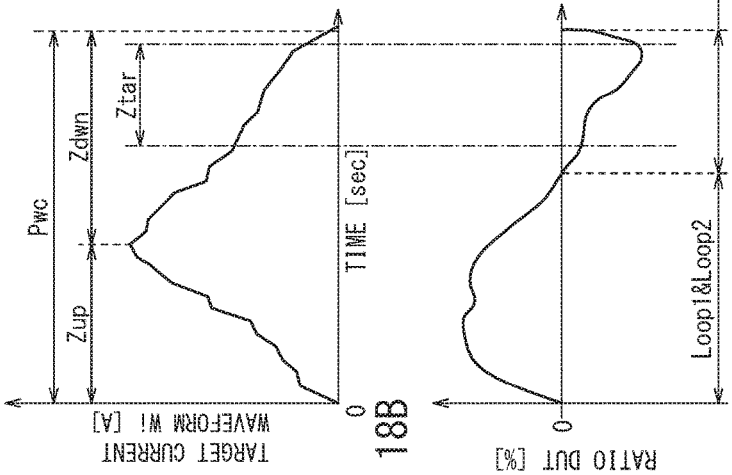
FIG. 18A
FIG. 18B

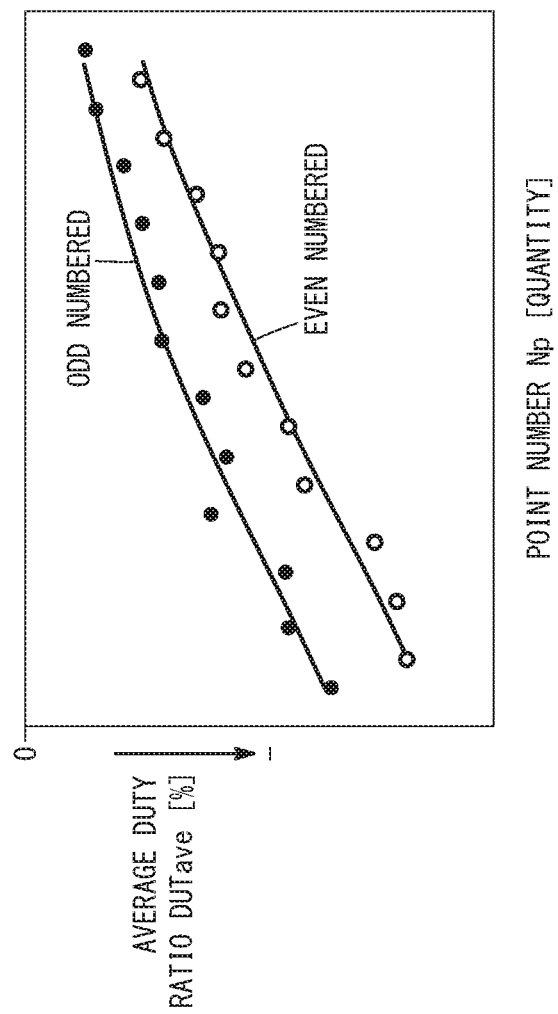

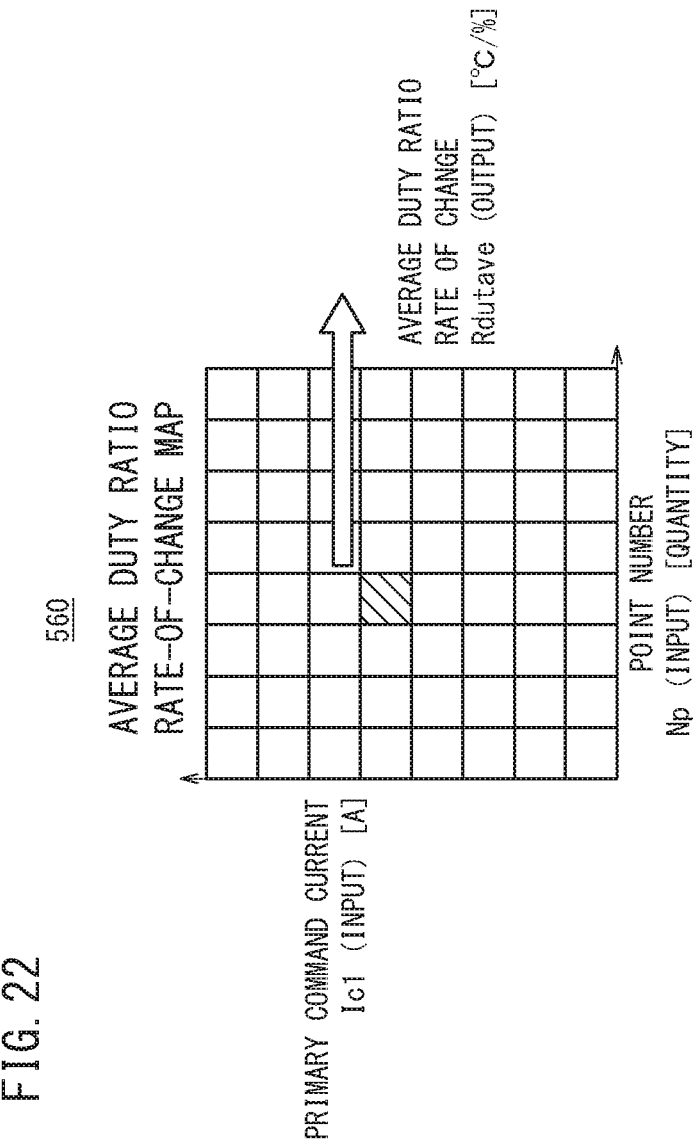

ACTIVE VIBRATION DAMPING DEVICE AND ACTIVE VIBRATION DAMPING METHOD

CROSS-REFERENCE TO RELATED APPLICATION

This application is based upon and claims the benefit of priority from Japanese Patent Application No. 2016-230754 filed on Nov. 29, 2016, the contents of which are incorporated herein by reference.

BACKGROUND OF THE INVENTION

Field of the Invention

The present invention relates to an active vibration damping device and an active vibration damping method for suppressing the transmission of vibrations from a drive source to a vehicle body.

Description of the Related Art

In Japanese Laid-Open Patent Publication No. 08-177965 (hereinafter referred to as "JPH08-177965A"), the temperature T of an engine mount main body 30 (or the temperature of a voice coil 31) is calculated on the basis of a control current value that flows through the voice coil 31 of an engine mount (abstract, paragraph [0014]). At this time, a decrease in the control current value is used, since if the temperature of the engine mount main body 30 rises and the temperature of the voice coil 31 rises, the resistance value of the voice coil 31 also increases (paragraph [0014]).

SUMMARY OF THE INVENTION

In the case of using a change in the resistance value corresponding to a temperature change of the voice coil 31, as was disclosed in JPH08-177965A, there is a concern that the accuracy in estimating the temperature may become deteriorated due to variations in the resistance value with respect to temperature.

The present invention has been devised taking into consideration the aforementioned problem, and an object of the present invention is to provide an active vibration damping device and an active vibration damping method, which enable the internal temperature of an actuator to be estimated with high accuracy.

An active vibration damping device according to the present invention includes:

an actuator disposed between a drive source and a vehicle body; and a computer configured to suppress transmission of vibrations from the drive source to the vehicle body by causing the actuator to actively generate vibrations;

wherein the computer includes:

an internal temperature estimating unit configured to calculate an internal temperature of the actuator;

a command value calculating unit configured to calculate an operation command value for the actuator from rotation information of the drive source;

a command value correction unit configured to correct the operation command value in accordance with the internal temperature;

a drive control unit configured to apply a drive voltage to the actuator using a voltage duty ratio based on the corrected operation command value; and a point number calculating unit configured to obtain an integer value point number which is set so as to become larger as a period of rotation of the drive source becomes longer; and wherein the internal temperature estimating unit includes:

an output average duty ratio calculating unit configured to calculate an output average duty ratio, which is an average of target values or actually measured values of the voltage duty ratios that are used for realizing the operation command value, when the period of rotation of the drive source is a predetermined period;

a reference average duty ratio calculating unit configured to calculate, on the basis of the operation command value and the point number, a reference average duty ratio, which is an average of the voltage duty ratios that realize the operation command value when the internal temperature is a reference temperature and the period of rotation of the drive source is the predetermined period;

an average duty ratio rate-of-change calculating unit configured to calculate, from the operation command value and the point number, an average duty ratio rate of change, which indicates a relationship between an amount of change of the internal temperature and an amount of change of an average duty ratio which is an average of the voltage duty ratios, when the period of rotation of the drive source is the predetermined period; and an internal temperature calculating unit configured to calculate as the internal temperature a value obtained by adding the reference temperature to a product of the average duty ratio rate of change and a deviation between the output average duty ratio and the reference average duty ratio.

Under conditions in which the period of rotation of the drive source and the operation command values remain equal or otherwise unchanged, the output average duty ratio varies in accordance with a difference in the internal temperature. According to the present invention, a value, which is obtained by adding the reference temperature to a product of the average duty ratio rate of change and a deviation between the output average duty ratio and the reference average duty ratio, is calculated as the internal temperature. Since the change in the resistance value inside the actuator is reflected in the voltage duty ratio, it is possible for the internal temperature to be estimated with high accuracy. Further, even for cases in which it is difficult to arrange an existing temperature sensor (for example, a thermistor or a thermocouple) inside of the actuator, or cases in which an existing temperature sensor is arranged outside of the actuator yet the measurement accuracy of the internal temperature is low, it is still possible to estimate the internal temperature with high accuracy. Alternatively, by dispensing with an existing type of temperature sensor as described above, it is possible to reduce the size or reduce the cost of the active vibration damping device as a whole. Alternatively, by using the present invention while also arranging an existing type of temperature sensor inside of the actuator, it is possible to provide a superior configuration from the standpoint of offering a fail-safe system.

The computer may further include a reference average duty ratio map in which there are stored in association with each other the reference average duty ratio and a combination of the operation command value and the point number, and an average duty ratio rate-of-change map in which there are stored in association with each other the average duty ratio rate of change and the combination of the operation command value and the point number, wherein the reference average duty ratio map and the average duty ratio rate-of-change map each define different relationships for a case in which the point number is an odd number and a case in which the point number is an even number.

In certain cases, the correlation between the average duty ratio and the internal temperature differs between the case in which the point number (an integer value which is set so as to increase as the period of rotation of the drive source increases) is an odd number and the case in which the point number is an even number. The reference average duty ratio map and the average duty ratio rate-of-change map may have different relationships defined therein for the case in which the point number is an odd number and the case in which the point number is an even number. Therefore, it is possible to estimate the internal temperature with high accuracy.

The reference average duty ratio calculating unit and the average duty ratio rate-of-change calculating unit may calculate the reference average duty ratio and the average duty ratio rate of change, which differ between a case in which the point number is an even number and a case in which the point number is an odd number. In accordance with this feature, for the same reasons as mentioned above, it is possible to estimate the internal temperature with high accuracy.

An active vibration damping method according to the present invention is a method using an active vibration damping device, including:

an actuator disposed between a drive source and a vehicle body; and a computer configured to suppress transmission of vibrations from the drive source to the vehicle body by causing the actuator to actively generate vibrations;

wherein the computer executes:

an internal temperature estimating step of estimating an internal temperature of the actuator;

a command value calculating step of calculating an operation command value for the actuator from rotation information of the drive source;

a command value correction step of correcting the operation command value in accordance with the internal temperature;

a drive control step of applying a drive voltage to the actuator using a voltage duty ratio based on the corrected operation command value; and a point number calculating step of obtaining an integer value point number which is set so as to become larger as a period of rotation of the drive source becomes longer; and wherein the internal temperature estimating step includes:

an output average duty ratio calculating step of calculating an output average duty ratio, which is an average of target values or actually measured values of the voltage duty ratios that are used for realizing the operation command value in the drive control step, when the period of rotation of the drive source is a predetermined period;

a reference average duty ratio calculating step of calculating, on the basis of the operation command value and the point number, a reference average duty ratio, which is an average of the voltage duty ratios that realize the operation command value when the internal temperature is a reference temperature and the period of rotation of the drive source is the predetermined period; and an internal temperature calculating step of calculating the internal temperature on the basis of a deviation between the output average duty ratio and the reference average duty ratio.

Under conditions in which the period of rotation of the drive source and the operation command values remain equal or otherwise unchanged, the output average duty ratio varies in accordance with a difference in the internal temperature. According to the present invention, the internal temperature of the actuator is estimated on the basis of a deviation between the reference average duty ratio and the output average duty ratio. Since the change in the resistance value inside the actuator is reflected in the voltage duty ratio, it is possible for the internal temperature to be estimated with high accuracy. Further, even for cases in which it is difficult to arrange an existing temperature sensor (for example, a thermistor or a thermocouple) inside of the actuator, or cases in which an existing temperature sensor is arranged outside of the actuator yet the measurement accuracy of the internal temperature is low, it is still possible to estimate the internal temperature with high accuracy. Alternatively, by dispensing with an existing type of temperature sensor as described above, it is possible to reduce the size or reduce the cost of the active vibration damping device as a whole. Alternatively, by using the present invention while also arranging an existing type of temperature sensor inside of the actuator, it is possible to provide a superior configuration from the standpoint of offering a fail-safe system.

The above and other objects, features, and advantages of the present invention will become more apparent from the following description when taken in conjunction with the accompanying drawings, in which preferred embodiments of the present invention are shown by way of illustrative example.

BRIEF DESCRIPTION OF THE DRAWINGS

FIGS. 10A to 10C are diagrams showing first, second, and third states in which a secondary target current waveform is calculated by a secondary target current waveform calculating unit of the embodiment;

FIG. 11A is a diagram showing a primary target current waveform calculated by the primary target current waveform calculating unit of the embodiment;

FIG. 11B is a diagram showing a secondary target current waveform calculated by the secondary target current waveform calculating unit of the embodiment;

FIG. 11C is a diagram showing a target current waveform calculated by a waveform synthesizing unit of the embodiment synthetically combining the primary target current waveform and the secondary target current waveform;

FIG. 18A shows an example of a target current arrangement according to the embodiment;

FIG. 18B is a diagram showing a voltage duty ratio in the case of using the target current arrangement of FIG. 18A;

FIG. 18C is an enlarged view of a portion of FIG. 18B;

FIG. 21 is a diagram showing an example of a relationship between a point number and an average duty ratio in the embodiment; and FIG. 22 is a diagram showing an average duty ratio rate-of-change map which is used by an average duty ratio rate-of-change calculating unit in the embodiment.

DESCRIPTION OF THE PREFERRED EMBODIMENTS

A. EMBODIMENT

A-1. Overall Configuration

[A-1-1. Overview]

Figure 1:
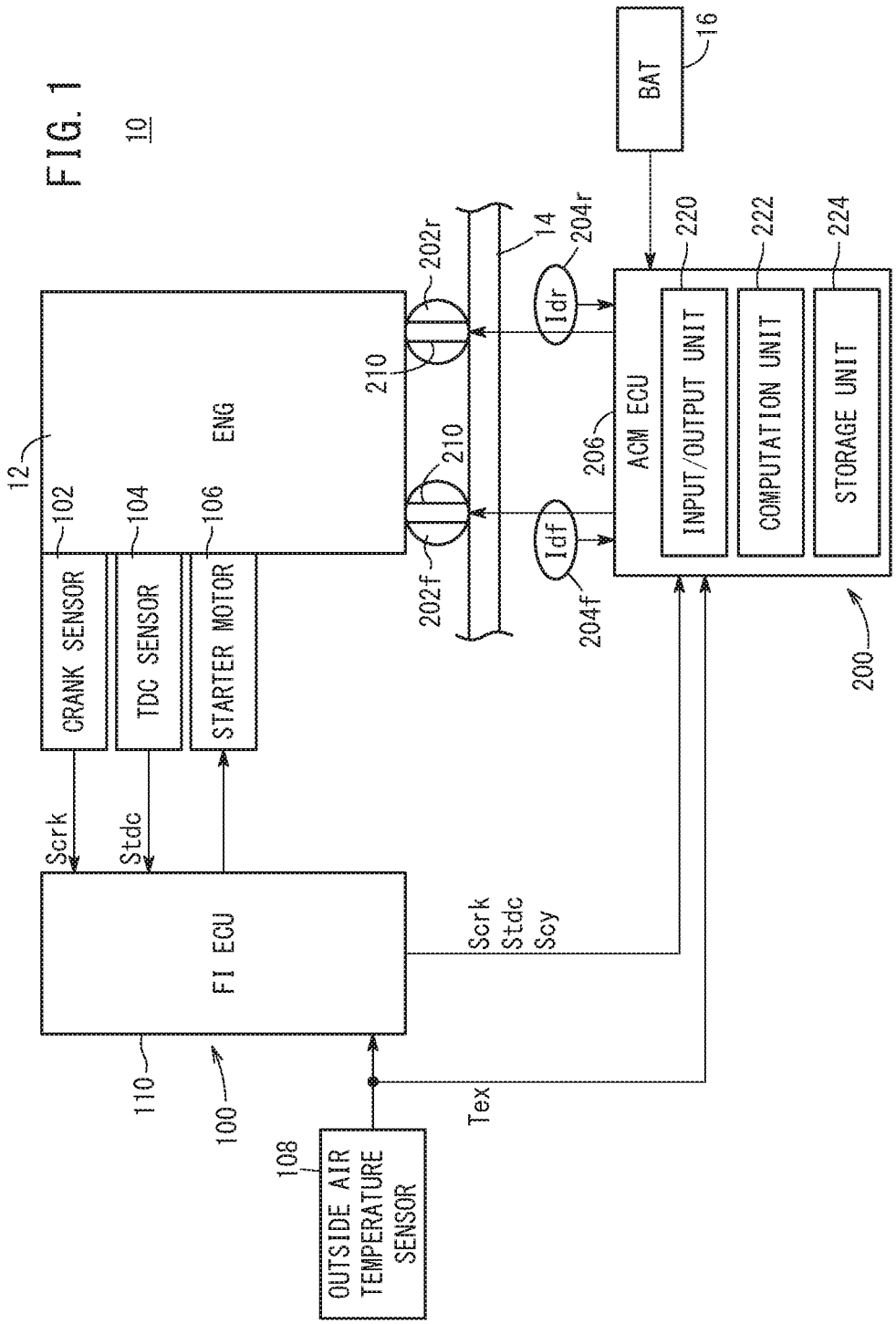
FIG. 1 is a schematic configuration diagram of a vehicle equipped with an active vibration damping device according to an embodiment of the present invention.

FIG. 1 is a schematic configuration diagram of a vehicle 10 equipped with an active vibration damping device 200 according to an embodiment of the present invention. As shown in FIG. 1, the vehicle 10 is a so-called engine vehicle that includes an engine 12 as a drive source (prime mover). As will be discussed later, the vehicle 10 may be a so-called hybrid vehicle that includes a traction motor in addition to the engine 12.

The engine 12 is supported in a vehicle body 14 through engine mounts 202f, 202r, in a state such that the axis of rotation thereof is oriented in a lateral or widthwise direction of the vehicle. As will be discussed later, the engine mounts 202f, 202r constitute parts of an active vibration damping device 200 for actively suppressing vibrations from the engine 12 (hereinafter referred to as "engine vibrations") by driving an actuator 210.

The vehicle 10 includes, in addition to the active vibration damping device 200, an engine control system 100 associated with the control of the engine 12, and a battery 16. Concerning the basic constituent elements of the vehicle 10, the same or similar features to those shown, for example, in JPH08-177965A, Japanese Laid-Open Patent Publication No. 2011-252553 (hereinafter referred to as "JP2011-252553A"), or U.S. Patent Application Publication No. 2014/0200792 (hereinafter referred to as "US2014/0200792A1") can be used.

[A-1-2. Engine 12 and Engine Control System 100]

The engine 12 of the present embodiment is a V-type six-cylinder engine that is capable of being driven in a partial cylinder rest mode, in which a portion of the plurality of cylinders that make up the engine 12 are operated, whereas the remaining cylinders are kept at rest. As will be discussed later, the engine 12 may have a number of cylinders other than six cylinders (for example, four cylinders or eight cylinders). Further, the arrangement of cylinders can be other than a V-type (for example, an L-type).

The engine control system 100 includes, as constituent elements associated with the engine 12, a crank sensor 102, a top dead center sensor 104 (hereinafter referred to as a "TDC sensor 104"), a starter motor 106, an outside air temperature sensor 108, and a fuel injection electronic control unit 110 (hereinafter referred to as an "FI ECU 110").

The crank sensor 102 detects a rotational position of a non-illustrated crankshaft (herein after referred to as a "crankshaft rotational position θcrk"), and outputs a signal representing the crankshaft rotational position θcrk (hereinafter referred to as a "crank pulse signal Scrk"), to the FI ECU 110. The TDC sensor 104 detects when a non-illustrated engine piston comes to a top dead center (top dead center timing), and outputs a signal representing the top dead center timing (hereinafter referred to as a "TDC pulse signal Stdc"), to the FI ECU 110.

The starter motor 106 is a motor (electric motor) that is used during motoring of the engine 12, which transmits a drive force with respect to the engine 12 based on electric power supplied from the battery 16. The outside air temperature sensor 108 detects the outside air temperature Tex [° C.] and outputs it to the FI ECU 110 and an ACM ECU 206.

The FI ECU 110 controls the engine 12 based on respective types of signals, such as the crank pulse signal Scrk and the TDC pulse signal Stdc, etc. For example, the FI ECU 110 calculates, on the basis of the crank pulse signal Scrk, revolutions per unit time of the engine 12 (hereinafter referred to as an "engine rotational speed Ne") [rpm], and uses it. In the same manner as a later-described ACM electronic control unit 206 (hereinafter referred to as an "ACM ECU 206") of the active vibration damping device 200, the FI ECU 110 includes an input/output unit, a computation unit, and a storage unit, none of which are shown.

The FI ECU 110 of the present embodiment controls the cylinder rest mode (cylinder operation mode) of the engine 12. The FI ECU 110 transmits the crank pulse signal Scrk, the TDC pulse signal Stdc, and a cylinder signal Scy which indicates the operating state of the cylinders (all-cylinder operation mode or cylinder rest mode) to the ACM ECU 206.

[A-1-3. Battery 16]

The battery 16 (power storage device) of the present embodiment is a so-called 12V battery, which supplies electric power to various auxiliary equipment (including the active vibration damping device 200) that operate at low voltage in the vehicle 10. As will be discussed later, it is also possible to use another power storage device in addition to or instead of the battery 16.

[A-1-4. Active Vibration Damping Device 200]

(A-1-4-1. Outline)

The active vibration damping device 200 (hereinafter also referred to simply as a "vibration damping device 200") suppresses transmission of vibrations from the engine 12 to the vehicle body 14. The vibration damping device 200 includes current sensors 204f, 204r in addition to the engine mounts 202f, 202r and the ACM ECU 206 that were described previously.

(A-1-4-2. Engine Mounts 202f, 202r)

Figure 2:
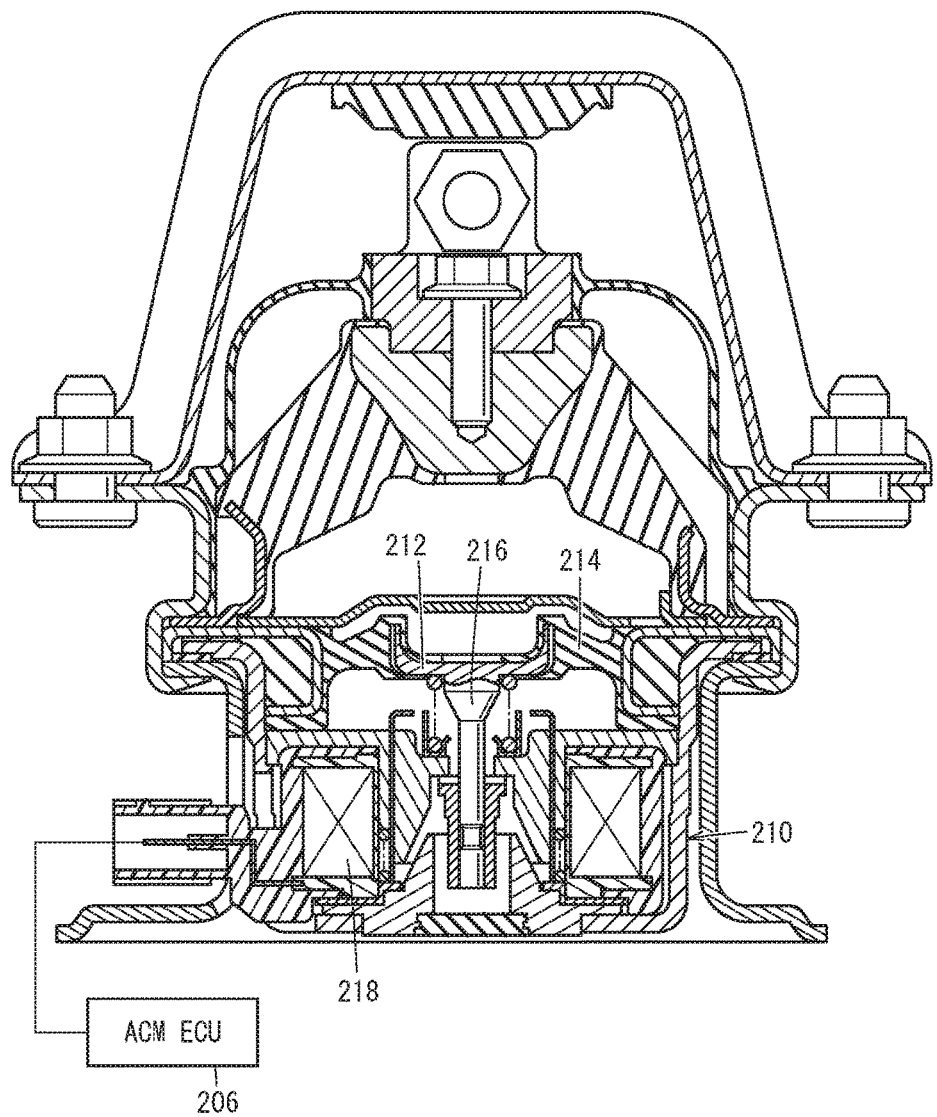
FIG. 2 is a diagram showing the internal configuration of an engine mount of the embodiment.

FIG. 2 is a diagram showing the internal configuration of the engine mounts 202f, 202r of the present embodiment. As shown in FIG. 2, the engine mounts 202f, 202r each include an actuator 210, an oscillating plate 212, and a rubber plate 214.

The actuator 210 generates canceling vibrations that cancel out the engine vibrations. As shown in FIG. 2, the actuator 210 includes a drive shaft 216 and a coil 218. The drive shaft 216 advances and retreats in accordance with an electromagnetic force caused by energizing (supplying current to) the coil 218. The oscillating plate 212 advances and retreats corresponding to the advancing and retreating movement of the drive shaft 216, and thereby biases a liquid that is sealed in the engine mounts 202f, 202r. The rubber plate 214 is fixed to the oscillating plate 212, and is displaced in accordance with the movement of the oscillating plate 212.

The engine mounts 202f, 202r are arranged in a mutually separated manner in forward and rearward directions of the vehicle 10, for example, similar to the arrangement shown in FIG. 1 of JP2011-252553A. The respective engine mounts 202f, 202r include actuators 210 in the interior thereof, for example, similar to the arrangement shown in FIG. 2 of JP2011-252553A. The actuators 210 can be constituted, for example, by solenoid valves. Alternatively, the actuators 210 can be configured to adjust, by non-illustrated valves, the negative pressure of the engine 12. Concerning the specific configuration and construction of the engine mounts 202f, 202r, it is possible to use, for example, the same constituent features as those of JP2011-252553A or US 2014/0200792A1.

In the following description, the engine mounts 202f, 202r are also referred to as ACMs 202f, 202r, which implies the meaning of active control mounts that actively suppress engine vibrations. The initials "ACM" as used in the term ACM ECU 206 also convey the meaning of active control mount.

(A-1-4-3. Current Sensors 204f, 204r)

The current sensors 204f, 204r detect currents (hereinafter referred to as "drive currents Idf, Idr" and collectively referred to as "drive currents Id") supplied from the battery 16 to the ACMs 202f, 202r via the ACM ECU 206, and outputs the detected values thereof to the ACM ECU 206.

(A-1-4-4. ACM ECU 206)

(A-1-4-4-1. Outline of ACM ECU 206)

The ACM ECU 206 controls the actuators 210 of the engine mounts 202f, 202r, and as shown in FIG. 1, includes an input/output unit 220, a computation unit 222, and a storage unit 224. The ACM ECU 206 drives the actuator 210 to thereby perform a vibration suppression control in order to suppress the transmission of engine vibrations to the vehicle body 14.

The input/output unit 220 carries out input and output of signals between the ACM ECU 206 and other elements. The computation unit 222 controls the ACMs 202f, 202r by executing the programs that are stored in the storage unit 224, and includes, for example, a central processing unit (CPU). Details of the computation unit 222 will be described later with reference to FIG. 3.

The storage unit 224 stores programs and data used by the computation unit 222. The storage unit 224 includes, for example, a random access memory (hereinafter referred to as a "RAM"). A volatile memory such as a register and a nonvolatile memory such as a flash memory can be used as the RAM. In addition to a RAM, the storage unit 224 may also include a read only memory (hereinafter referred to as a "ROM").

Moreover, according to the present embodiment, it is assumed that the programs and data used by the computation unit 222 are stored in the storage unit 224 of the vehicle 10. However, for example, portions of the programs and data may be acquired from an external server (not shown) via a wireless device (not shown) included in the input/output unit 220.

A-2. Configuration of Computation Unit 222 of ACM ECU 206

[A-2-1. Outline of Computation Unit 222)

Figure 3:
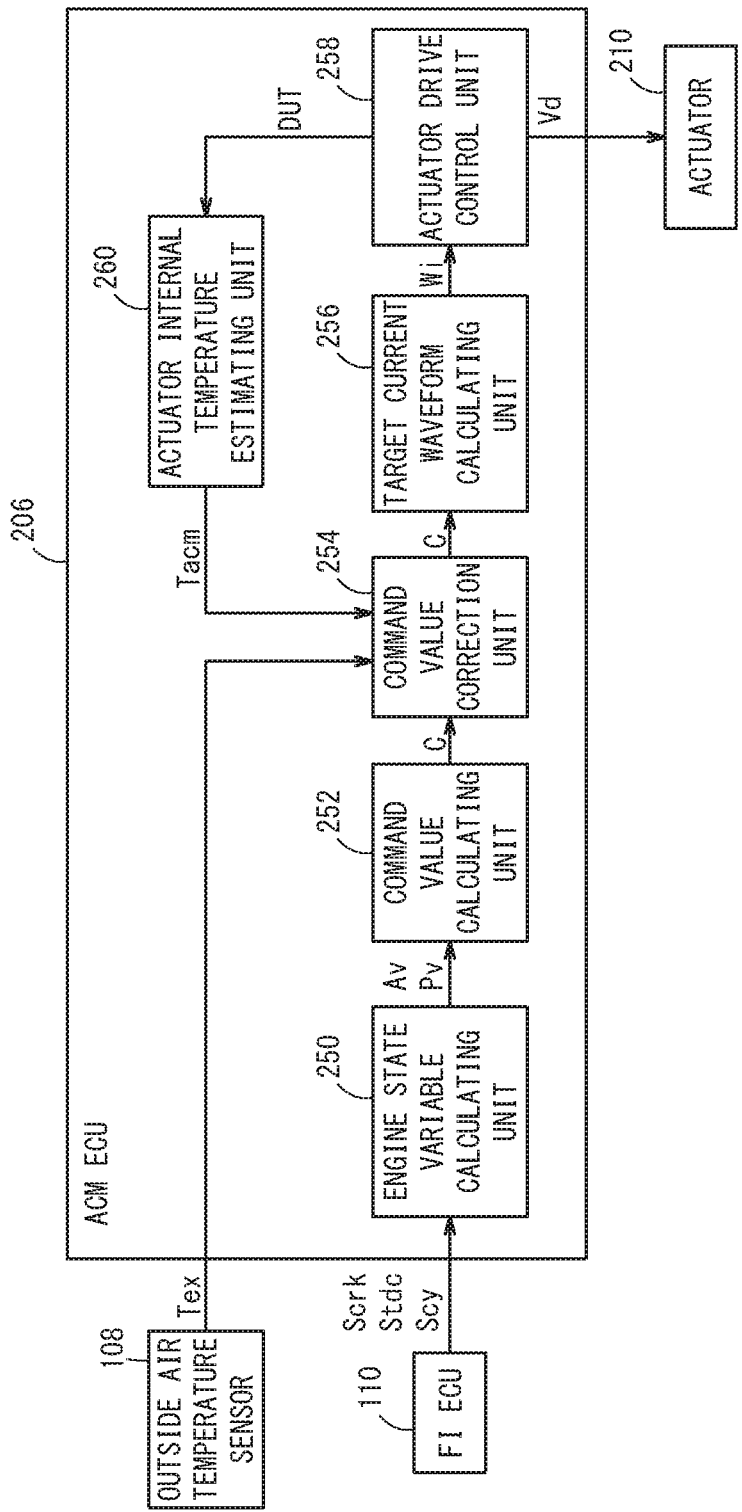
FIG. 3 is a block diagram showing details of a computation unit (including functions realized by the computation unit) of an ACM electronic control device of the embodiment.

FIG. 3 is a block diagram showing details of the computation unit 222 of the ACM ECU 206 of the present embodiment (including functions realized by the computation unit 222). As shown in FIG. 3, the computation unit 222 includes an engine state variable calculating unit 250, a command value calculating unit 252, a command value correction unit 254, a target current waveform calculating unit 256, an actuator drive control unit 258, and an actuator internal temperature estimating unit 260. The respective components of the computation unit 222 shown in FIG. 3 are functional units realized by executing programs stored in the storage unit 224. For this reason, a portion of FIG. 3 is drawn in the form of a flowchart.

An engine state variable calculating unit 250 (hereinafter also referred to as a "variable calculating unit 250") calculates, as engine state variables, an engine vibration amplitude Av (hereinafter also referred to as a "vibration amplitude Av" or an "amplitude Av"), and an engine period of rotation Pv (hereinafter also referred to as a "period Pv", a "period of rotation Pv" or a "vibration period Pv"). Instead of the period of rotation Pv, a frequency may be calculated.

The variable calculating unit 250 can calculate the torque of the engine 12 using the period of rotation Pv or the like. More specifically, a CRK pulse interval as indicated by the CRK pulse signal Scrk is calculated. Next, a crank angular velocity is calculated by dividing a predetermined crank angle by the CRK pulse interval, and further, a crank angular acceleration is calculated by differentiating the crank angular velocity over time. In addition, a predetermined inertia about the crankshaft of the engine 12 is multiplied by the crank angular acceleration to thereby calculate the torque about the crankshaft.

The command value calculating unit 252 calculates operation command values C (hereinafter also referred to as "command values C") based on the amplitude Av and the period of rotation Pv.

The command value correction unit 254 corrects the command values C on the basis of the command values C from the command value calculating unit 252, the outside air temperature Tex from the outside air temperature sensor 108, and the internal temperature Tacm from the actuator internal temperature estimating unit 260. The target current waveform calculating unit 256 (hereinafter also referred to simply as a "waveform calculating unit 256") calculates a target current waveform Wi on the basis of the command values C after correction thereof by the command value correction unit 254.

The actuator drive control unit 258 (hereinafter also referred to as a "drive control unit 258") drives the actuator 210 on the basis of the target current waveform Wi. More specifically, the drive control unit 258 calculates a voltage duty ratio DUT on the basis of the target current waveform Wi, and applies the drive voltage Vd to the actuator 210 using the voltage duty ratio DUT (hereinafter also referred to simply as a "duty ratio DUT"). Based on the duty ratio DUT, the actuator internal temperature estimating unit 260 (hereinafter also referred to as an "internal temperature estimating unit 260" or a "temperature estimating unit 260") estimates (or calculates) the internal temperature Tacm of the actuator 210 (hereinafter referred to as an "actuator internal temperature Tacm" or an "ACM internal temperature Tacm").

[A-2-2. Engine State Variable Calculating Unit 250]

Figure 4:
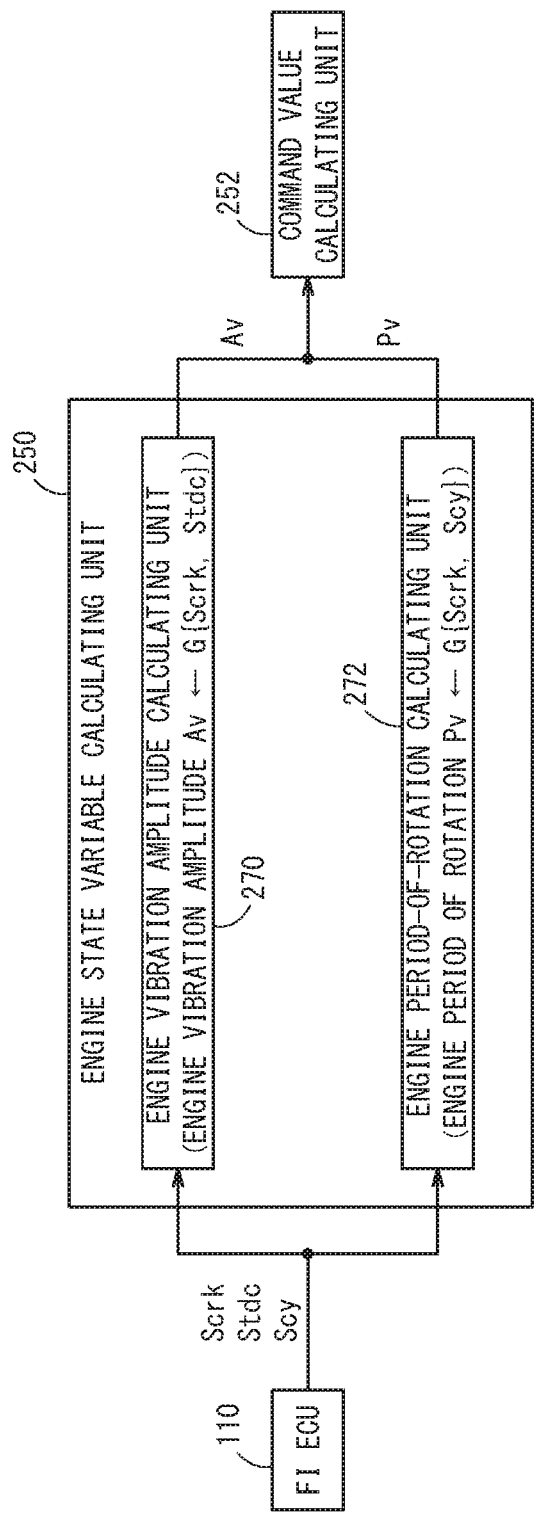
FIG. 4 is a block diagram showing details of an engine state variable calculating unit of the embodiment.

FIG. 4 is a block diagram showing details of the engine state variable calculating unit 250 of the present embodiment. As noted previously, the variable calculating unit 250 calculates the engine vibration amplitude Av and the engine period of rotation Pv as engine state variables. As shown in FIG. 4, the engine state variable calculating unit 250 includes an engine vibration amplitude calculating unit 270 (hereinafter also referred to simply as an "amplitude calculating unit 270"), and an engine period-of-rotation calculating unit 272 (hereinafter also referred to as a "period calculating unit 272"). The respective components of the variable calculating unit 250 shown in FIG. 4 are functional units realized by executing programs stored in the storage unit 224. For this reason, a portion of FIG. 4 is drawn in the form of a flowchart.

The amplitude calculating unit 270 calculates the vibration amplitude Av on the basis of the crank pulse signal Scrk and the TDC pulse signal Stdc. More specifically, the amplitude calculating unit 270 calculates a cumulative value ∫Dcrk of an interval Dcrk [sec] of a specified point in time (e.g., rising or falling) occurring within one period of the crank pulse signal Scrk. Next, the amplitude calculating unit 270 calculates an average value Dcrkave (=(∫Dcrk)/Dtdc) by dividing the cumulative value ∫Dcrk by the interval Dtdc of the top dead center timing. In addition, the amplitude calculating unit 270 calculates a deviation ΔDcrk between the interval Dcrk at each of the specified points in time and the average value Dcrkave, and sets the difference [sec] between the maximum value and the minimum value of the deviation ΔDcrk as the vibration amplitude Av. Since the vibration amplitude Av possesses a high correlation with the actual engine vibration amplitude, the vibration amplitude Av is used in place of the engine vibration amplitude.

In FIG. 4, the description provided in parentheses in the amplitude calculating unit 270 indicates a process (or step) performed in the amplitude calculating unit 270. More specifically, the amplitude calculating unit 270 calculates the vibration amplitude Av using the crank pulse signal Scrk and the TDC pulse signal Stdc as principal input values. In this instance, the letter "G" in FIG. 4 signifies a function. The same feature applies to other constituent elements.

The period calculating unit 272 calculates the period of rotation Pv on the basis of the CRK pulse signal Scrk and the cylinder signal Scy. More specifically, the period calculating unit 272 calculates as the vibration period Pv [sec] an interval of specified point in time (e.g., rising or falling) occurring within one period of the CRK pulse signal Scrk. Instead of the vibration Pv, the engine vibration frequency [Hz], which is the reciprocal of the vibration period Pv, can also be used. The cylinder signal Scy is used in order to determine a change in the vibration period Pv in accordance with the operating state of the cylinders.

[A-2-3. Command Value Calculating Unit 252]

Figure 5:
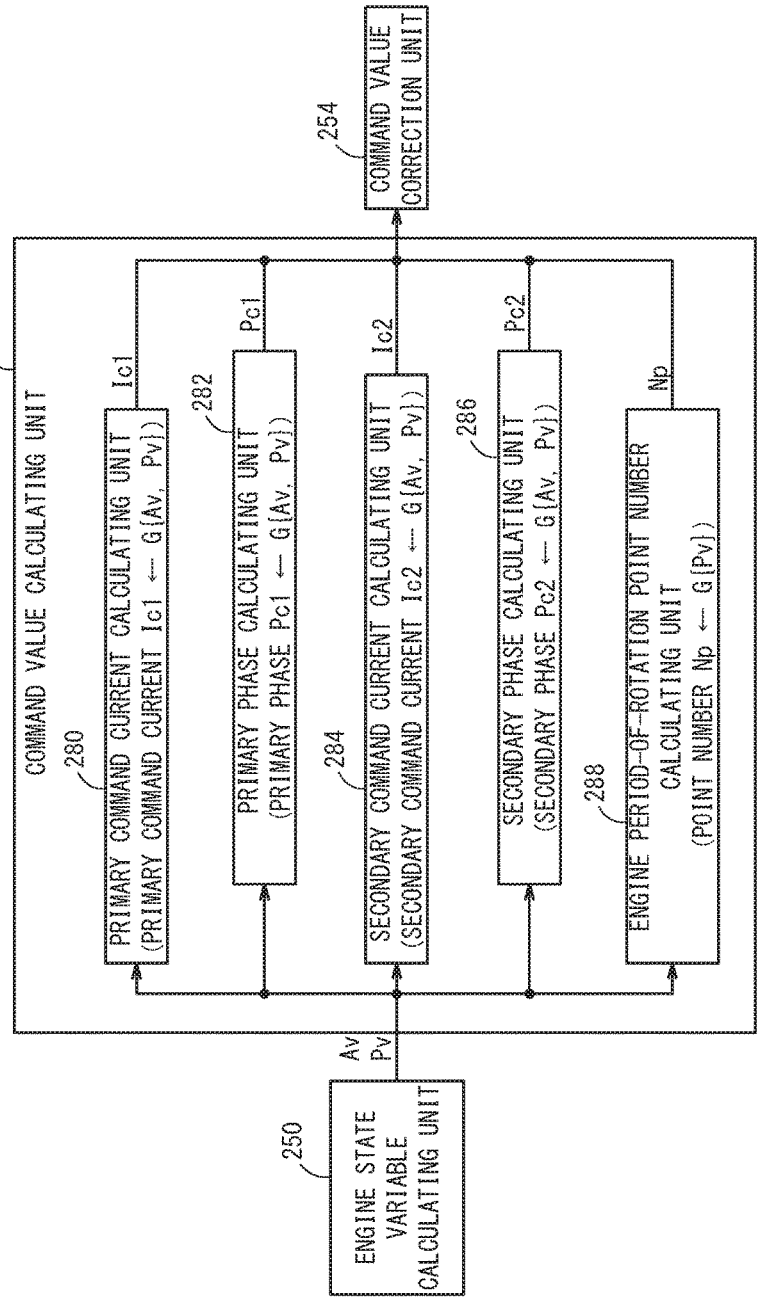
FIG. 5 is a block diagram showing details of a command value calculating unit of the embodiment.

FIG. 5 is a block diagram showing details of the command value calculating unit 252 of the present embodiment. As noted previously, the command value calculating unit 252 calculates the operation command values C on the basis of the amplitude Av and the period of rotation Pv. As shown in FIG. 5, the command value calculating unit 252 includes a primary command current calculating unit 280, a primary phase calculating unit 282, a secondary command current calculating unit 284, a secondary phase calculating unit 286, and an engine period-of-rotation point number calculating unit 288 (hereinafter also referred to simply as a "point number calculating unit 288"). The respective components of the command value calculating unit 252 shown in FIG. 5 are functional units realized by executing programs stored in the storage unit 224. For this reason, a portion of FIG. 5 is drawn in the form of a flowchart.

The primary command current calculating unit 280 calculates a primary command current Ic1 [A] for each of combinations of the vibration amplitude Av and the vibration period Pv. The primary command current Ic1 is a primary component of a command value Ir (hereinafter also referred to as a "command current Ir") of the current supplied to the actuator 210. More specifically, the primary command current calculating unit 280 includes a map (primary command current map) therein, which defines a relationship between the primary command current Ic1 and combination of the vibration amplitude Av and the vibration period Pv. In addition, the primary command current calculating unit 280 reads out from the primary command current map a primary command current Ic1, which corresponds to a combination of the vibration amplitude Av and the vibration period Pv, and outputs the primary command current Ic1 to the command value correction unit 254.

The primary phase calculating unit 282 calculates the primary phase Pc1 [rad] for each of combinations of the vibration amplitude Av and the vibration period Pv. The primary phase Pc1 is the phase of the primary command current Ic1. More specifically, the primary phase calculating unit 282 includes a map (primary phase map) therein, which defines a relationship between the primary phase Pc1 and combination of the vibration amplitude Av and the vibration period Pv. In addition, the primary phase calculating unit 282 reads out from the primary phase map a primary phase Pc1, which corresponds to a combination of the vibration amplitude Av and the vibration period Pv, and outputs the primary phase Pc1 to the command value correction unit 254.

The secondary command current calculating unit 284 calculates a secondary command current Ic2 [A] for each of combinations of the vibration amplitude Av and the vibration period Pv. The secondary command current Ic2 is a secondary component of the command current Ir to the actuator 210. More specifically, the secondary command current calculating unit 284 includes a map (secondary command current map) therein, which defines a relationship between the secondary command current Ic2 and combination of the vibration amplitude Av and the vibration period Pv. In addition, the secondary command current calculating unit 284 reads out from the secondary command current map a secondary command current Ic2, which corresponds to a combination of the vibration amplitude Av and the vibration period Pv, and outputs the secondary command current Ic2 to the command value correction unit 254.

The secondary phase calculating unit 286 calculates the secondary phase Pc2 [rad] for each of combinations of the vibration amplitude Av and the vibration period Pv. The secondary phase Pc2 is the phase of the secondary command current Ic2. More specifically, the secondary phase calculating unit 286 includes a map (secondary phase map) therein, which defines a relationship between the secondary phase Pc2 and combination of the vibration amplitude Av and the vibration period Pv. In addition, the secondary phase calculating unit 286 reads out from the secondary phase map a secondary phase Pc2, which corresponds to a combination of the vibration amplitude Av and the vibration period Pv, and outputs the secondary phase Pc2 to the command value correction unit 254.

Figure 6:
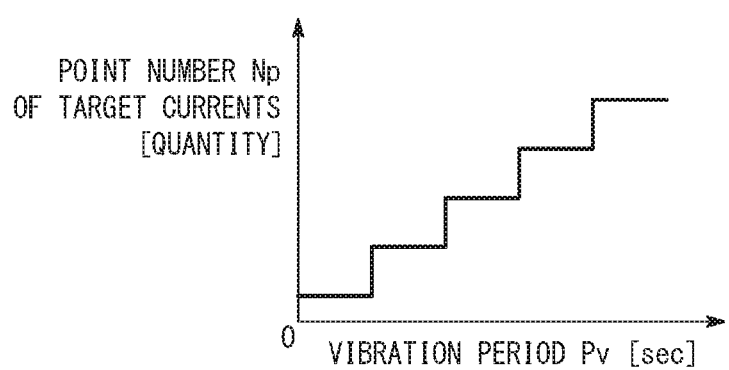
FIG. 6 is a diagram showing a point number map used by a point number calculating unit of the embodiment.

FIG. 6 is a diagram showing a point number map 300 used by the point number calculating unit 288 of the present embodiment. The point number calculating unit 288 calculates the point number Np [–] of the target current Itar depending on the vibration period Pv. The point number Np is the number (quantity) of target currents Itar included within one waveform computation period Pwc (see FIG. 9, etc.), and the point number Np increases as the vibration period Pv increases. The point number calculating unit 288 includes a point number map 300 in which a relationship is defined between the vibration period Pv and the point number Np. In addition, the point number calculating unit 288 reads out the point number Np corresponding to the vibration period Pv from the point number map 300, and outputs the point number Np to the command value correction unit 254.

[A-2-4. Command Value Correction Unit 254]

Figure 7:
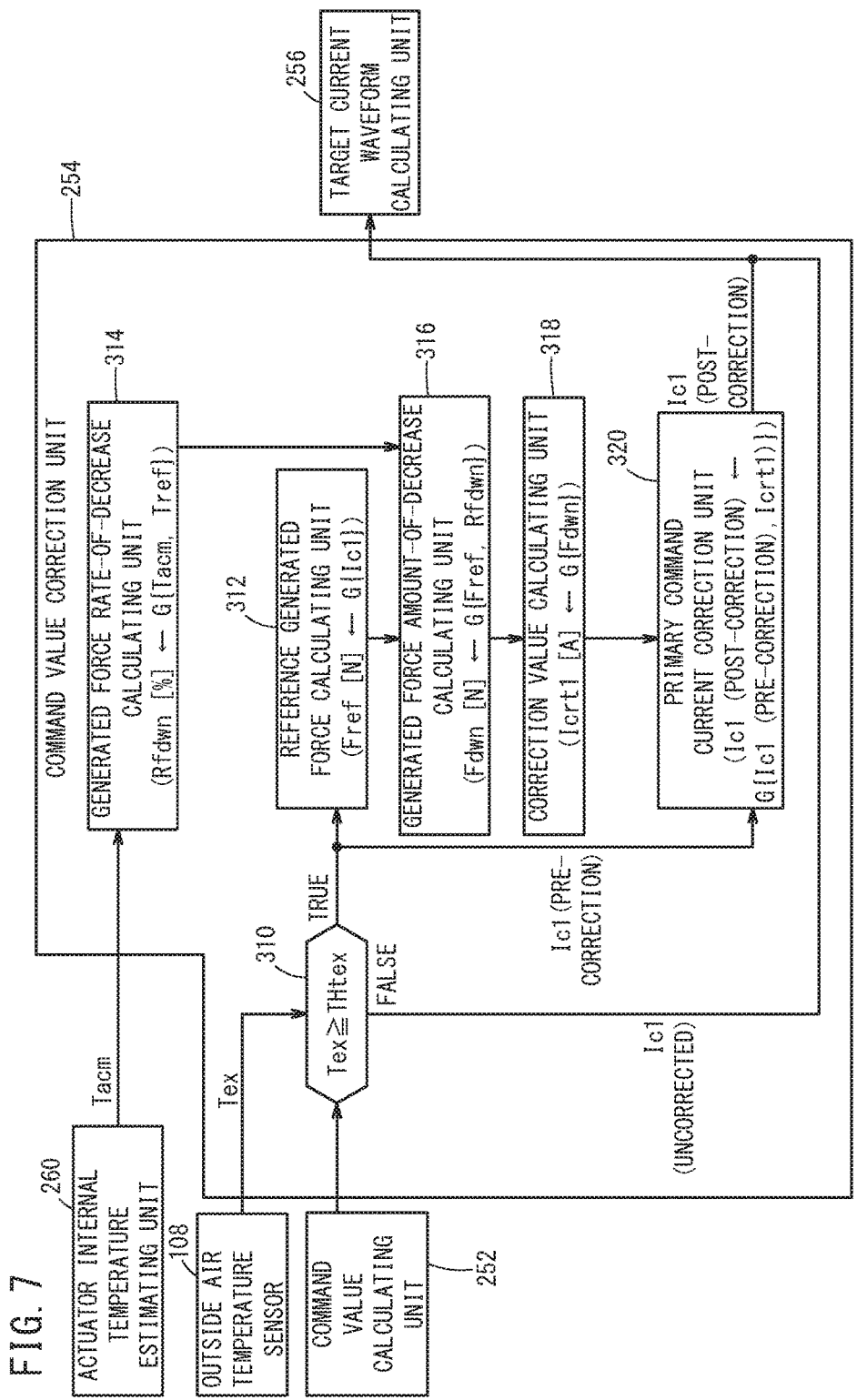
FIG. 7 is a block diagram showing details of a command value correction unit of the embodiment.

FIG. 7 is a block diagram showing details of the command value correction unit 254 of the present embodiment. As noted above, the command value correction unit 254 corrects the command value C (in particular, the primary command current Ic1) from the command value calculating unit 252, on the basis of the outside air temperature Tex from the outside air temperature sensor 108 and the internal temperature Tacm from the actuator internal temperature estimating unit 260. More specifically, even if the later-described target current waveform Wi is the same, the force F (hereinafter also referred to as a "generated force F") generated by the actuator 210 changes due to differences in the internal temperature Tacm. Thus, the command value correction unit 254 corrects the primary command current Ic1 in accordance with the internal temperature Tacm.

As shown in FIG. 7, the command value correction unit 254 includes an outside air temperature determining unit 310, a reference generated force calculating unit 312 (hereinafter also referred to as a "generated force calculating unit 312"), a generated force rate-of-decrease calculating unit 314 (hereinafter also referred to as a "rate-of-decrease calculating unit 314"), a generated force amount-of-decrease calculating unit 316 (hereinafter also referred to as an "amount-of-decrease calculating unit 316"), a correction value calculating unit 318, and a primary command current correction unit 320. The respective components of the command value correction unit 254 shown in FIG. 7 are functional units realized by executing programs stored in the storage unit 224. For this reason, a portion of FIG. 7 is drawn in the form of a flowchart.

The outside air temperature determining unit 310 determines whether or not the outside air temperature Tex is greater than or equal to an outside air temperature threshold value THtex. The outside air temperature threshold value THtex is a threshold value for determining whether or not the internal temperature estimating unit 260 should carry out an estimation of the internal temperature Tacm in the present embodiment, and is set as a reference temperature Tref as described later or a value in close proximity to the reference temperature Tref. In the case that the outside air temperature Tex is greater than or equal to the outside air temperature threshold THtex (if true), the internal temperature estimating unit 260 performs an estimation of the internal temperature Tacm. In the case that the outside air temperature Tex is smaller than the outside air temperature threshold THtex (if false), the internal temperature estimating unit 260 does not perform an estimation of the internal temperature Tacm.

Based on the primary command current Ic1, the generated force calculating unit 312 calculates a reference generated force Fref [N], which is a reference value of the generated force F of the actuator 210. The rate-of-decrease calculating unit 314 calculates a rate of decrease in the generated force Rfdwn, which is indicative of the degree to which the generated force F of the actuator 210 is decreased in accordance with an increase in the internal temperature Tacm from the internal temperature estimating unit 260. As will be discussed later, according to the present embodiment, the internal temperature estimating unit 260 estimates the internal temperature Tacm in the event that the internal temperature Tacm is greater than or equal to the reference temperature Tref. Further, in the case that the internal temperature Tacm is greater than or equal to the reference temperature Tref, the generated force F of the actuator 210 decreases as the internal temperature Tacm increases.

The amount-of-decrease calculating unit 316 calculates an amount of decrease Fdwn in the generated force F in accordance with the internal temperature Tacm. More specifically, the amount-of-decrease calculating unit 316 calculates the amount of decrease Fdwn as a product of the reference generated force Fref and the rate of decrease in the generated force Rfdwn (Fdwn=Fref·Rfdwn). The correction value calculating unit 318 converts the amount of decrease Fdwn in the generated force F into a current, and calculates a correction value Icrt1 with respect to the primary command current Ic1. The primary command current correction unit 320 corrects the primary command current Ic1 by adding the correction value Icrt1 to the primary command current Ic1 (Ic1 (post-correction)=Ic1 (pre-correction)+Icrt1).

[A-2-5. Target Current Waveform Calculating Unit 256]

(A-2-5-1. Outline of Target Current Waveform Calculating Unit 256)

Figure 8:
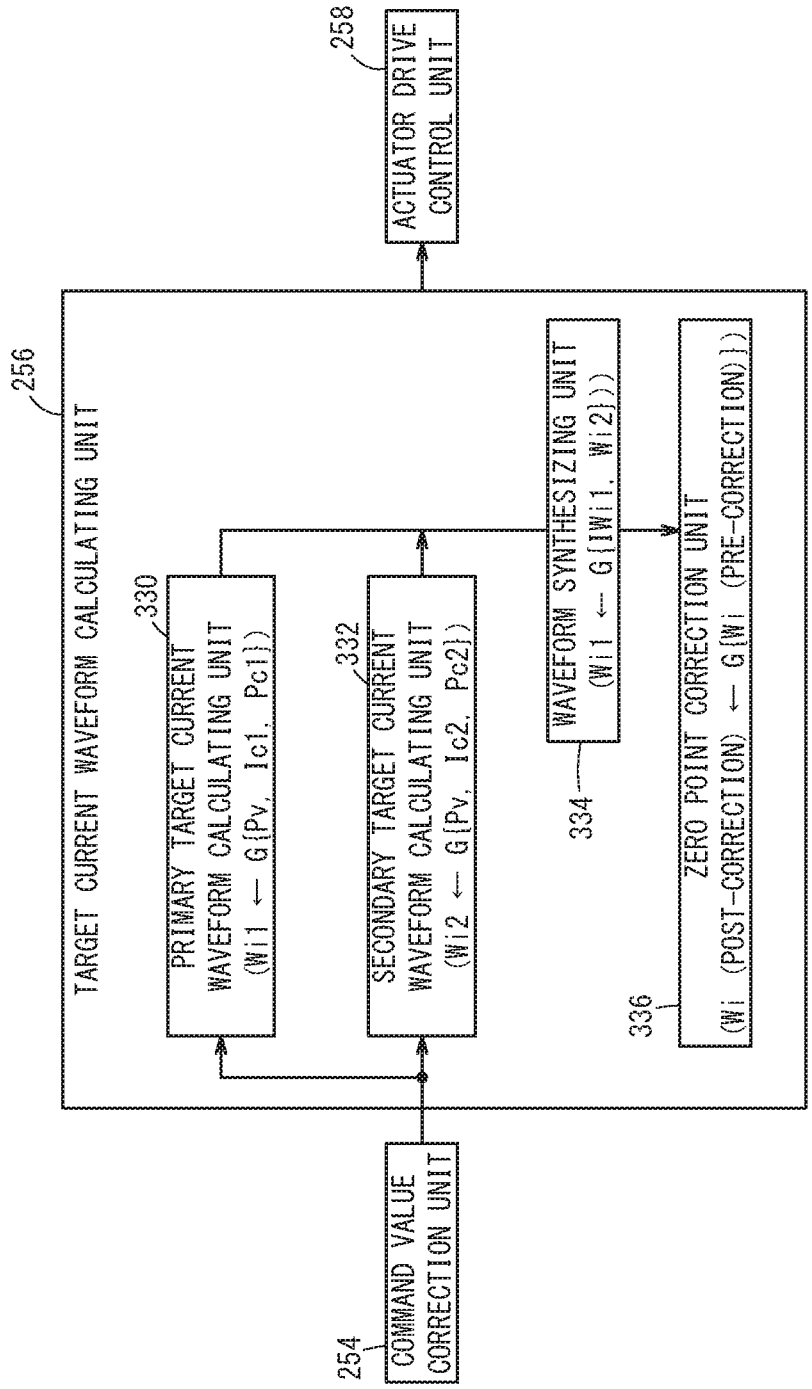
FIG. 8 is a block diagram showing details of a target current waveform calculating unit of the embodiment.

FIG. 8 is a block diagram showing details of the target current waveform calculating unit 256 of the present embodiment. As noted previously, the waveform calculating unit 256 calculates the target current waveform Wi (see FIG. 9) on the basis of the command values C (the primary command current Ic1, etc.) that were corrected by the command value correction unit 254. As shown in FIG. 8, the target current waveform calculating unit 256 includes a primary target current waveform calculating unit 330 (hereinafter also referred to as a "primary waveform calculating unit 330"), a secondary target current waveform calculating unit 332 (hereinafter also referred to as a "secondary waveform calculating unit 332"), a waveform synthesizing unit 334, and a zero point correction unit 336. The respective components of the waveform calculating unit 256 shown in FIG. 8 are functional units realized by executing programs stored in the storage unit 224. For this reason, a portion of FIG. 8 is drawn in the form of a flowchart.

(A-2-5-2. Primary Target Current Waveform Calculating Unit 330)

Figure 9:
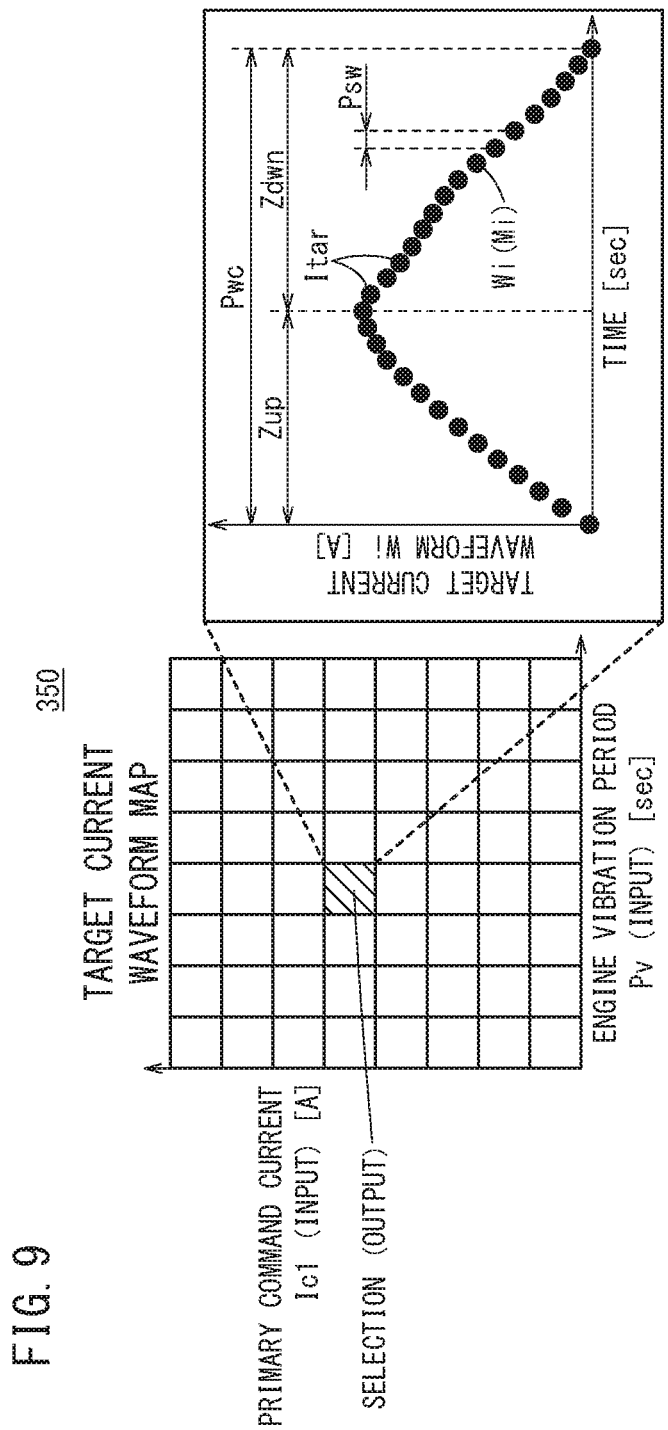
FIG. 9 is a diagram showing a target current waveform map used by a primary target current waveform calculating unit of the embodiment.

FIG. 9 is a diagram showing a target current waveform map 350 used by the primary target current waveform calculating unit 330 of the present embodiment. In the target current waveform map 350 (hereinafter also referred to as a "target waveform map 350"), a target current arrangement Mi is stored for each of combinations of the engine vibration period Pv and the primary command current Ic1. The target current arrangement Mi is an arrangement made up from a plurality of the target currents Itar, and forms the target current waveform Wi.

The primary waveform calculating unit 330 reads out a target current arrangement Mi, which corresponds to a combination of the engine vibration period Pv and the primary command current Ic1, from the target waveform map 350. In addition, the primary phase Pc1 is reflected in the read out target current arrangement Mi to thereby obtain the primary target current waveform Wi1. The method by which the primary phase Pc1 is reflected therein is the same as a method (to be described later) by which the secondary phase Pc2 is reflected therein, as will be described with reference to FIG. 10B.

(A-2-5-3 Secondary Target Current Waveform Calculating Unit 332)

The secondary waveform calculating unit 332 calculates the secondary target current waveform Wi2 on the basis of the vibration period Pv, the secondary command current Ic2, and the secondary phase Pc2. More specifically, the secondary waveform calculating unit 332 reads out a target current arrangement Mi, which corresponds to a combination of the engine vibration period Pv and the secondary command current Ic2, from the target waveform map 350, and thereby produces the secondary target current waveform Wi2. In the case that the target waveform map 350 is used in common for the primary target current waveform Wi1 and the secondary target current waveform Wi2, the target current arrangements Mi, which correspond to combinations of a period obtained by halving the engine vibration period Pv and the secondary command current Ic2, are read out from the target waveform map 350.

FIGS. 10A to 10C are diagrams showing first, second, and third states in which a secondary target current waveform Wi2 is calculated by the secondary target current waveform calculating unit 332 of the present embodiment. In FIG. 10A, a secondary target current waveform Wi2 is shown, which was calculated on the basis of the vibration period Pv and the secondary command current Ic2. More specifically, in the secondary target current waveform Wi2 of FIG. 10A, the same waveform is repeated twice within one waveform computation period Pwc. Stated otherwise, the secondary target current waveform calculating unit 332 reads out a target current arrangement Mi, which corresponds to a combination of one half of the engine vibration period Pv and the secondary command current Ic2, from the target waveform map 350, and thereby produces the secondary target current waveform Wi2 in which the target current arrangement Mi is repeated twice.

In FIG. 10B, a feature is shown in which the secondary phase Pc2 is reflected in the secondary target current waveform Wi2 of FIG. 10A. More specifically, the secondary target current waveform Wi2 of FIG. 10B is adjusted in a manner so as to be delayed by the secondary phase Pc2 with respect to the secondary target current waveform Wi2 of FIG. 10A. Consequently, a portion (on the right side) indicated by the white circles of the target current Itar that makes up the secondary target current waveform Wi2 of FIG. 10B protrudes from the current waveform computation period Pwc. As shown in FIG. 10C, for usage thereof, the ECU 206 moves the protruding portion of the target current Itar (the white circles) in FIG. 10B to the beginning of the same waveform computation period Pwc.

(A-2-5-4. Waveform Synthesizing Unit 334)

The waveform synthesizing unit 334 calculates the target current waveform Wi (composite target current waveform) by superposing the primary target current waveform Wi1 and the secondary target current waveform Wi2. In FIGS. 11A to 11C, an aspect is shown in which the waveform synthesizing unit 334 of the present embodiment calculates the target current waveform Wi (composite target current waveform).

FIG. 11A is a diagram showing the primary target current waveform Wi1 calculated by the primary target current waveform calculating unit 330 of the present embodiment. FIG. 11B is a diagram showing the secondary target current waveform Wi2 calculated by the secondary target current waveform calculating unit 332 of the present embodiment. FIG. 11C is a diagram showing a target current waveform Wi calculated by the waveform synthesizing unit 334 synthetically combining the primary target current waveform Wi1 and the secondary target current waveform Wi2. As shown in FIG. 11C, the target current waveform Wi includes the rising current interval Zup and the falling current interval Zdwn within one waveform computation period Pwc.

(A-2-5-5. Zero Point Correction Unit 336)

The zero point correction unit 336 carries out a zero point correction with respect to the target current waveform Wi that was calculated by the target current waveform calculating unit 256. As shown in FIG. 11C, in certain cases, the target current waveform Wi may become greater than zero over the totality of one waveform computation period Pwc. The zero point correction is a correction to lower the entire target current waveform Wi so that the minimum value of the target current waveform Wi becomes zero. The target current waveform Wi on which the zero point correction was performed is shown in FIG. 18A, as will be discussed later.

[A-2-6. Actuator Drive Control Unit 258]

(A-2-6-1. Outline of Actuator Drive Control Unit 258)

Figure 12:
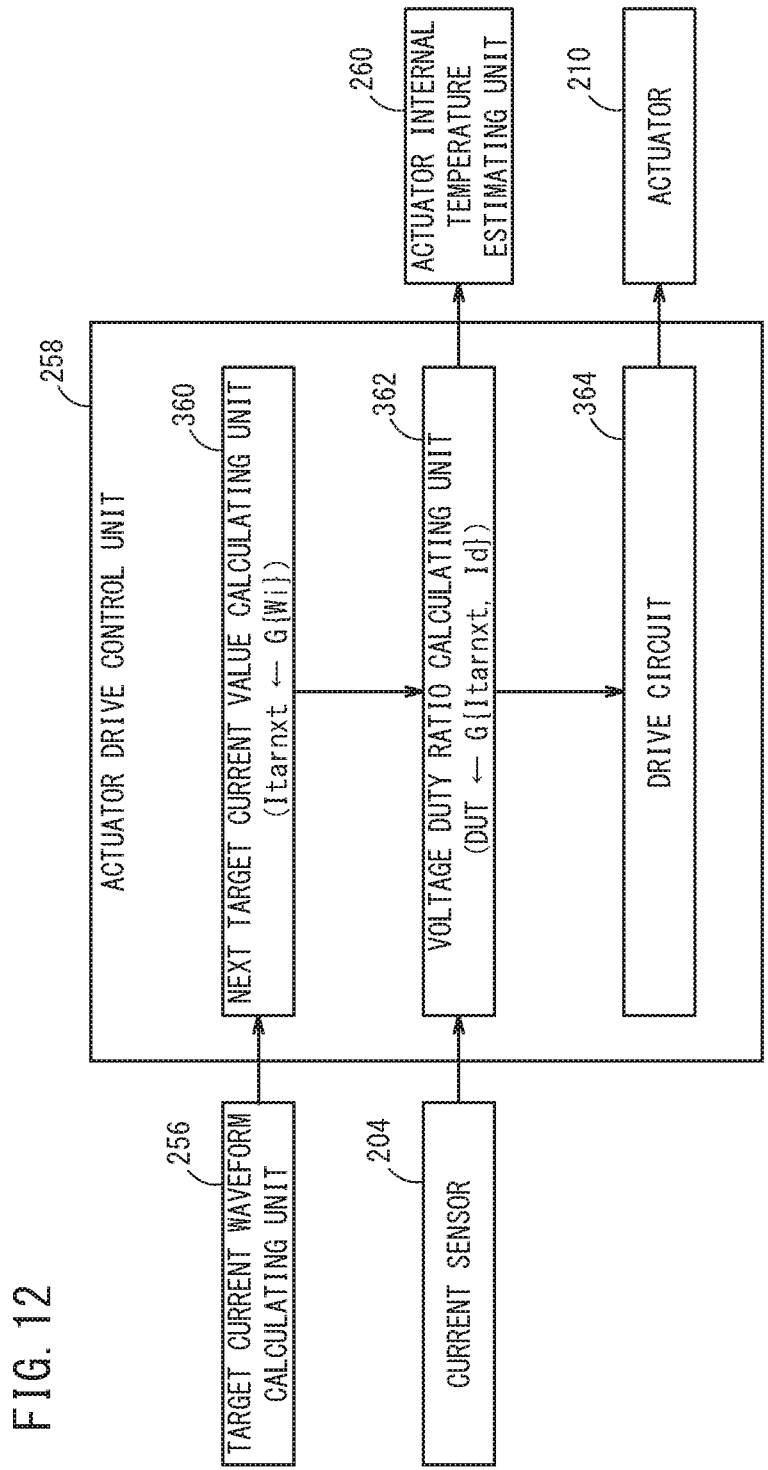
FIG. 12 is a block diagram showing details of an actuator drive control unit of the embodiment.
Figure 13:
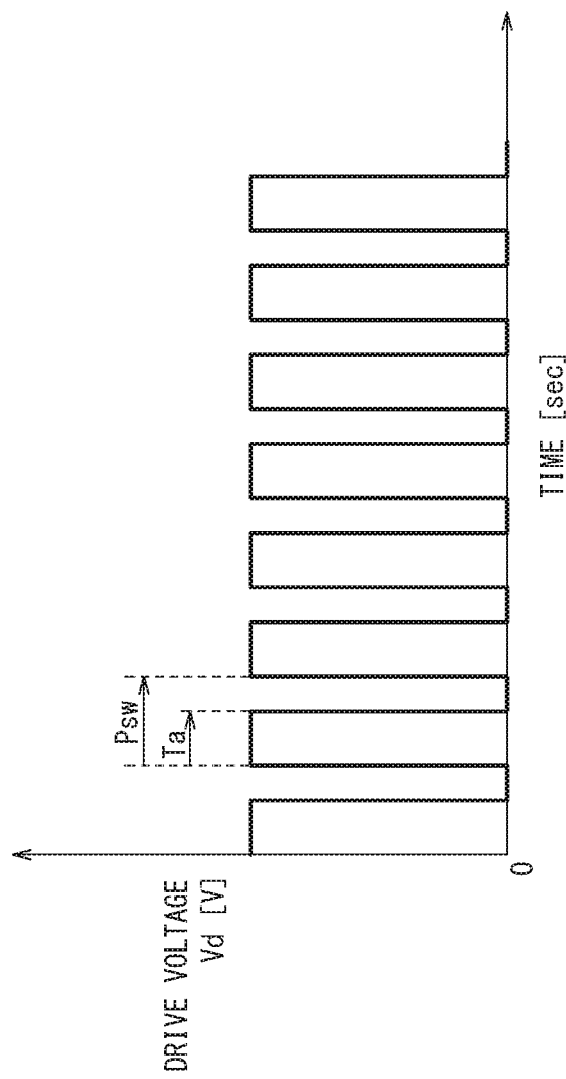
FIG. 13 is a diagram showing an example of a drive voltage output by the actuator drive control unit of the embodiment.

FIG. 12 is a block diagram showing details of the actuator drive control unit 258 of the present embodiment. FIG. 13 is a diagram showing an example of a drive voltage Vd output by the actuator drive control unit 258 of the present embodiment. As discussed above, the drive control unit 258 drives the actuator 210 based on the target current waveform Wi (or the target current arrangement Mi). More specifically, the drive control unit 258 calculates a voltage duty ratio DUT on the basis of the target current waveform Wi, and applies the drive voltage Vd to the actuator 210 using the voltage duty ratio DUT.

As shown in FIG. 12, the drive control unit 258 comprises a next target current value calculating unit 360 (hereinafter referred to as a "next value calculating unit 360"), a voltage duty ratio calculating unit 362 (hereinafter also referred to as a "duty ratio calculating unit 362"), and a drive circuit 364. Among the components of the drive control unit 258 shown in FIG. 12, the next value calculating unit 360 and the duty ratio calculating unit 362 are functional units realized by executing programs stored in the storage unit 224. The drive circuit 364 is configured in the form of a circuit component (hardware). Moreover, in FIG. 12, although only one current sensor 204 and one actuator 210 are shown, as shown in FIG. 1, a plurality of current sensors 204 and a plurality of actuators 210 are actually provided.

(A-2-6-2. Next Value Calculating Unit 360)

The next value calculating unit 360 selects in sequential order one-by-one a plurality of target currents Itar that make up the target current waveforms Wi (see FIG. 11C) calculated by the target current waveform calculating unit 256, and sets them as the next target currents Itarnxt (hereinafter referred to as "next values Itarnxt").

(A-2-6-3. Duty Ratio Calculating Unit 362)

The duty ratio calculating unit 362 calculates a voltage duty ratio DUT (hereinafter also referred to as a "duty ratio DUT") on the basis of the next values Itarnxt from the next value calculating unit 360, and the drive currents Id from the current sensors 204. The duty ratio DUT is a ratio of the time Ta over which the drive voltage Vd is applied, to one switching period Psw (see FIG. 13), and is defined by the following formula (1).

$$DUT=Ta/Psw \quad (1)$$

A plurality of the switching periods Psw are included within the waveform computation period Pwc. As is apparent from FIG. 13, the drive voltage Vd is a fixed voltage.

When calculating the duty ratio DUT, the duty ratio calculating unit 362 uses a so-called PID (Proportional-Integral-Differential) control. More specifically, the duty ratio calculating unit 362 calculates the duty ratio DUT according to the following formula (2).

$$DUT(n)=P(n)+I(n)+D(n) \quad (2)$$

In the above formula (2), P is a P-term (proportional term), I is an I-term (integral term), and D is a D-term (differential term). The P, I, and D terms are defined respectively by the following formulas (3) to (5).

$$P(n)=Kp\{Itar(n+1)-Id(n)\} \quad (3)$$

$$I(n)=Ki\{Itar(n)-Id(n)\} \quad (4)$$

$$D(n)=D(n-1)+Kd\{Itar(n)-Id(n)\} \quad (5)$$

In formulas (2) to (5), "n" indicates the value in the current switching period Psw, "n−1" indicates the value in the previous switching period Psw, and "n+1" indicates the value in the next switching period Psw. Kp is the P-term gain, Ki is the I-term gain, and Kd is the D-term gain. In the present embodiment, the respective gains Kp, Ki, Kd are variable (details thereof will be described later in connection with FIG. 15).

As noted previously, the target current waveform Wi (or the target current arrangement Mi) uses the rising current interval Zup and the falling current interval Zdwn. In order to realize the rising current interval Zup and the falling current interval Zdwn, according to the present embodiment, the numerical value of each of the items Kp, Ki, Kd is switched. Concerning the switching method, a description thereof will be provided later after having first described the configuration of the drive circuit 364.

(A-2-6-4. Drive Circuit 364)

Figure 14:
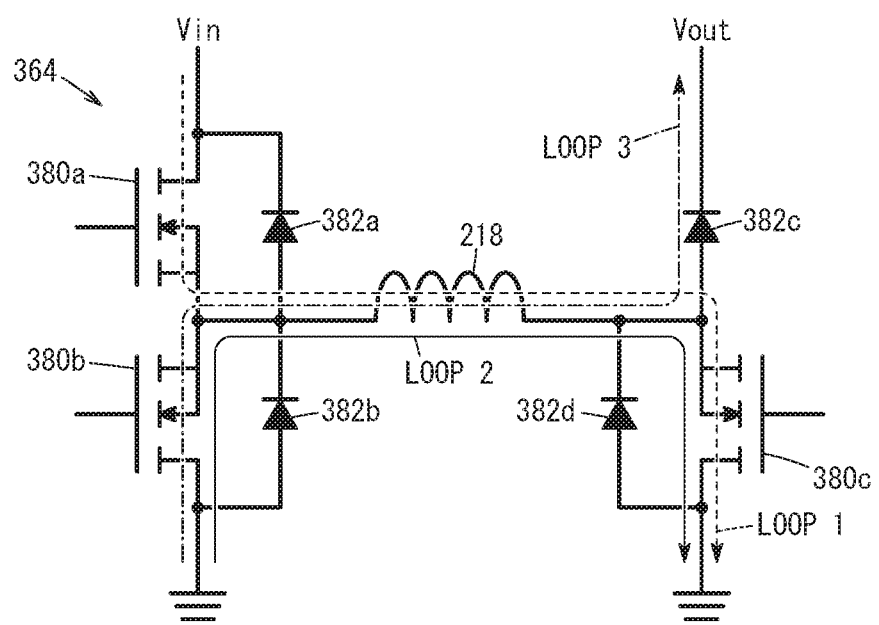
FIG. 14 is a diagram showing a portion of a drive circuit of the embodiment.

FIG. 14 is a diagram showing a portion of the drive circuit 364 of the present embodiment. The drive circuit 364 applies the drive voltage Vd to the actuator 210 using the duty ratio DUT. Stated otherwise, according to the present embodiment, a pulse width modulation (PDM) technique is utilized. For this reason, the drive voltage Vd is a fixed voltage. In the present embodiment, although the drive circuit 364 makes up a portion of the computation unit 222 (actuator drive control unit 258), the drive circuit 364 may be configured as portions of the ACMs 202f, 202r. The drive circuit 364 switches the supply of electric power (or application of voltage) to the actuators 210.

As shown in FIG. 14, the drive circuit 364 includes first to third switching elements 380a to 380c (hereinafter also referred to as "first to third SW elements 380a to 380c" or simply "SW elements 380a to 380c"), and first to fourth diodes 382a to 382d.

The term Vin in FIG. 14 indicates the input voltage from the battery 16 (see FIG. 1). The input voltage Vin need not be the output voltage (battery voltage Vbat) from the battery 16 itself, but may be a step-up voltage in which the battery voltage Vbat is boosted by a non-illustrated voltage step-up circuit. The term Vout in FIG. 14 indicates an output voltage that is output to the battery 16.

The first SW element 380a and the first diode 382a are arranged in parallel between the battery 16 and the coil 218 (see FIG. 14). The second SW element 380b and the second diode 382b are arranged in parallel between the coil 218 and ground. The third diode 382c is disposed between the battery 16 and the coil 218. The third SW element 380c and the fourth diode 382d are arranged between the coil 218 and ground.

In the drive circuit 364, three loops (loops 1 to 3) are formed by switching the SW elements 380a to 380c. Loop 1, which is indicated by the dashed line in FIG. 14, is a loop when the SW elements 380a and 380c are turned on and the SW element 380b is turned off. Loop 2, which is indicated by the solid line, is a loop when the SW elements 380b and 380c are turned on and the SW element 380a is turned off. Loop 3, which is indicated by the one-dot-dashed line, is a loop when the SW elements 380a to 380c are all turned off.

Moreover, a drive circuit other than the drive circuit 364 may be used for the drive circuit that supplies the drive currents Id to the actuator 210.

(A-2-6-5. Switching of Items Kp, Ki, Kd)

Figure 15:
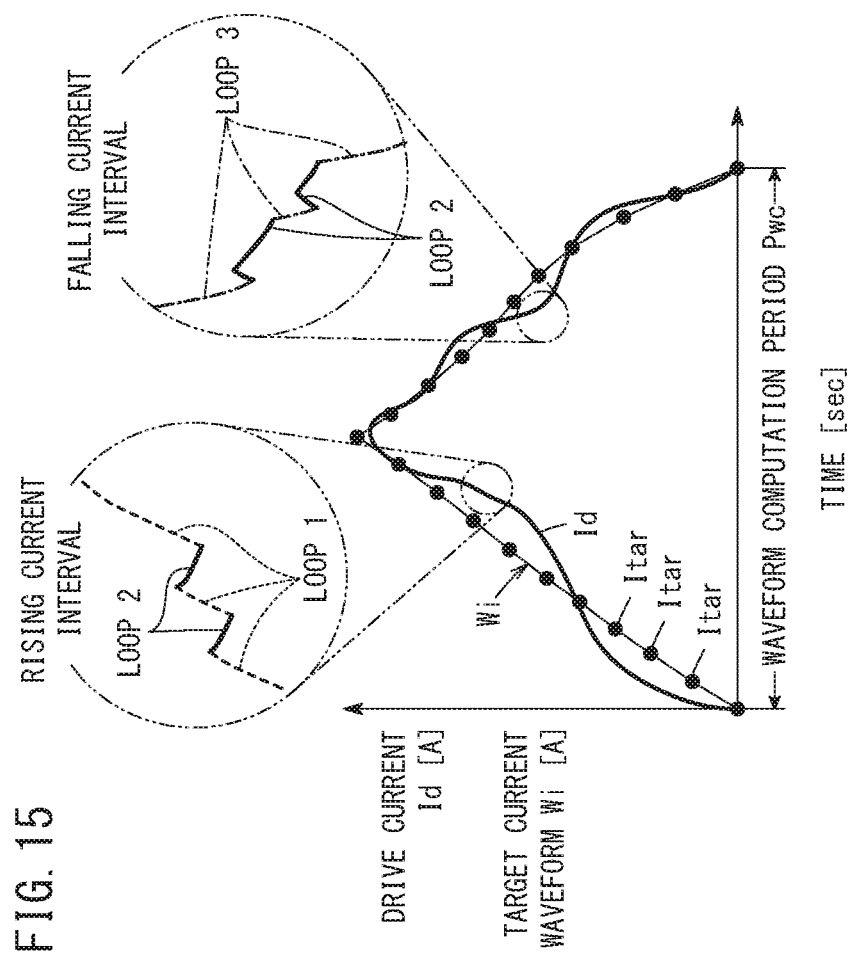
FIG. 15 is a diagram showing examples of an actuator target current waveform and a drive current waveform used in an active vibration damping control of the embodiment.

FIG. 15 is a diagram showing examples of the target current waveform Wi for the actuator 210 and the drive current waveform Id used in the active vibration damping control of the present embodiment. The target current waveform Wi is a target value for the drive current Id. As shown in FIG. 15, the target current waveform Wi is set by dividing a period (the waveform computation period Pwc or the operation period) in which the actuator 210 is advanced and retracted one time, and the period is divided into a plurality of points. Stated otherwise, the target current waveform Wi is set as a plurality of target currents Itar. The target current waveform Wi (or the target current arrangement Mi) is formed by the plurality of target currents Itar.

Each of intervals between two adjacent target currents Itar corresponds to a switching period Psw [sec] of the SW elements 380a to 380c. In the front side ACM 202f and the rear side ACM 202r, the target currents Itar thereof are set so as to be shifted in phase with the same amplitude or different amplitudes.

Further, as was described in connection with FIG. 14, according to the present embodiment, the actuators 210 are controlled by the drive circuit 364 using the loops 1 to 3. When the drive current Id is increased, loop 1 and loop 2 are alternately switched (refer to the "rising current interval" in the upper left of FIG. 15). When the drive current Id is decreased, loop 3 and loop 2 are alternately switched (refer to the "falling current interval" in the upper right of FIG. 15).

In the present embodiment, the ECU 206 switches the loops 1 to 3 in the following manner.

If Itar−Id≥0→Loop 1
If Itar−Id<0 and DUT>0→Loop 2
If Itar−Id<0 and DUT≤0→Loop 3

The ECU 206 switches the values of the terms Kp, Ki, and Kd for each of the loops 1 to 3. Consequently, the rising current interval Zup and the falling current interval Zdwn are realized, as shown in FIG. 15. More specifically, in the rising current interval Zup, loop 1 and loop 2 are combined, and in the falling current interval Zdwn, loop 2 and loop 3 are combined, thereby realizing the target current waveform Wi shown in FIG. 15.

[A-2-7. Actuator Internal Temperature Estimating Unit 260]
(A-2-7-1. Basic Approach for Estimating the Actuator Internal Temperature Tacm)

As described above, the internal temperature estimating unit 260 estimates (or calculates) the internal temperature Tacm of the actuator on the basis of the duty ratio DUT.

Figure 16:
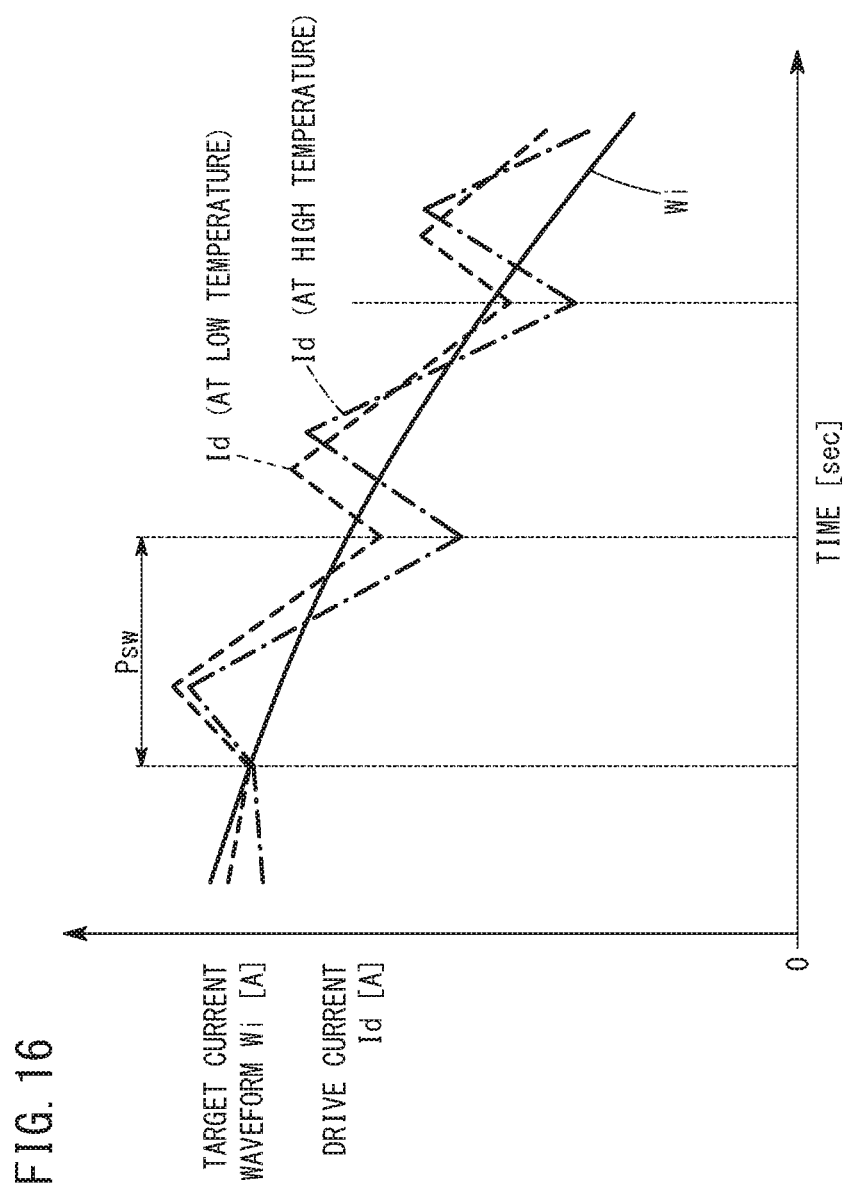
FIG. 16 is a diagram showing an example of a relationship between the target current waveform and drive currents at a time of low temperature and at a time of high temperature in the embodiment.

FIG. 16 is a diagram showing an example of a relationship between the target current waveform Wi and the drive current Id at a time of low temperature and at a time of high temperature in the present embodiment. In FIG. 16, an aspect is shown when the target current waveform Wi and the drive current Id are decreasing (or in other words, during the falling current interval Zdwn).

As shown in FIG. 16, the slope (i.e., the time derivative value of the drive current Id or the current inclination deviation ΔI [A/sec]) differs between the drive current Id at low temperature and the drive current Id at high temperature. In particular, the slope differs significantly when the drive current Id decreases due to the loop 2 (refer to the "current falling interval" in the upper right of FIG. 15). Thus, according to the present embodiment, the ACM internal temperature Tacm is estimated using the change in the slope of the drive current Id (in particular, the slope at the time of loop 2). More specifically, the ACM internal temperature Tacm is estimated using the degree of change in the duty ratio DUT accompanying a change in the slope of the drive current Id.

Figure 17:
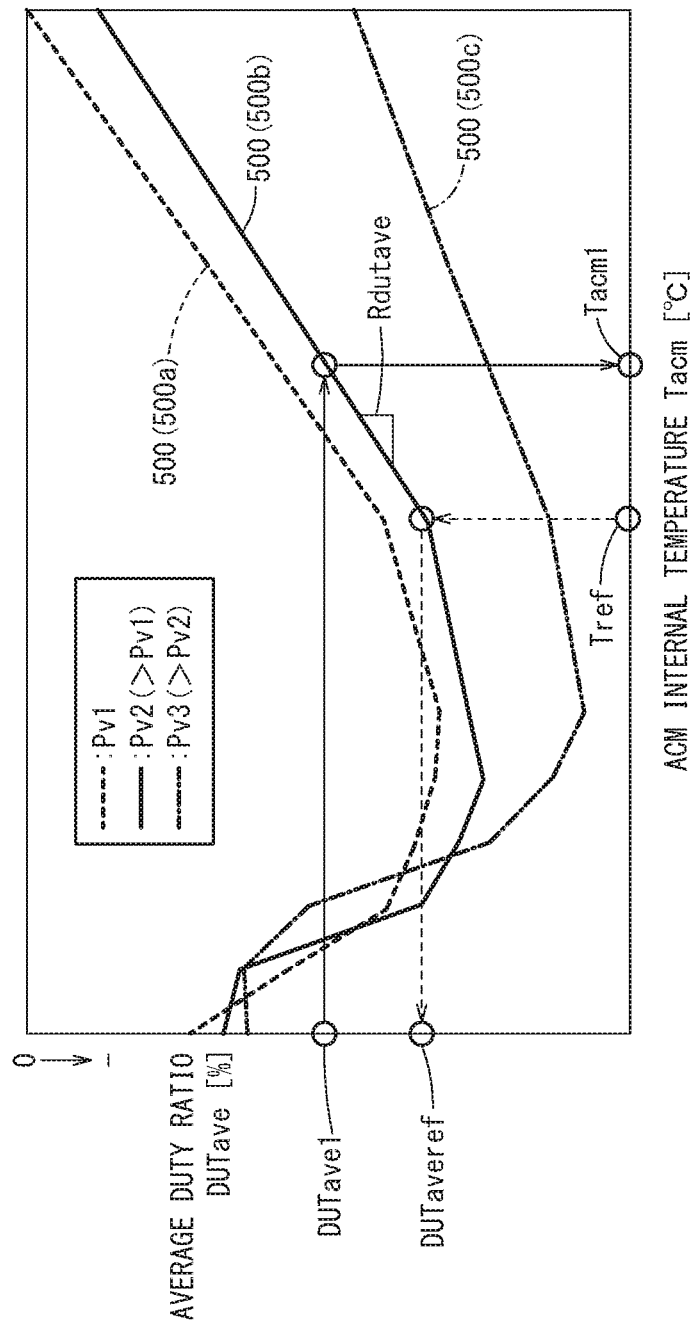
FIG. 17 is a diagram for explaining the principle of temperature estimation according to the embodiment.

FIG. 17 is a diagram for explaining the principle of temperature estimation according to the present embodiment. As shown in FIG. 17, the internal temperature estimating unit 260 of the present embodiment estimates the ACM internal temperature Tacm using the average duty ratio DUTave and the point number Np. The average duty ratio DUTave is an average of the duty ratios DUT (details will be described later with reference to FIG. 18).

According to the present embodiment, since the average duty ratio DUTave in a portion of the falling current interval Zdwn (for example, until the duty ratio DUT decreases from a first duty ratio threshold value THdut1 to a second duty ratio threshold value THdut2 (<THdut1)) is used, the average duty ratio DUTave in the falling current interval Zdwn may also be referred to as a "falling interval average duty ratio DUTavedwn". It should also be noted that the point number Np has a correspondence relationship with the vibration period Pv (see FIG. 6).

In the case that the internal temperature Tacm is greater than or equal to the reference temperature Tref (see FIG. 17), for each of the point numbers Np, the internal temperature Tacm and the falling interval average duty ratio DUTavedwn can be approximated by the relationship of a secondary straight line (regression line). Thus, in the case that the outside air temperature Tex is greater than or equal to the reference temperature Tref, the ECU 206 estimates the internal temperature Tacm on the basis of the point number Np and the falling interval average duty ratio DUTavedwn.

More specifically, internal temperature-average duty ratio characteristics 500 are specified based on the point number Np (for example, the characteristic 500b is specified from among the characteristics 500a to 500c shown in FIG. 17), and together therewith, the falling interval average duty ratio DUTavedwn (for example, DUTave1 in FIG. 17) is specified based on the duty ratio DUT. According to the present embodiment, the slope of the secondary straight line in accordance with the internal temperature-average duty ratio characteristics 500 is used as an average duty ratio rate of change Rdutave [° C/%]. The average duty ratio rate of change Rdutave is indicative of an amount of change in the internal temperature Tacm when the average duty ratio DUTave is increased by one.

In addition, in the internal temperature-average duty ratio characteristics 500, an internal temperature Tacm corresponding to the falling interval average duty ratio DUTavedwn (for example, Tacm1 in FIG. 17) is set as the current internal temperature Tacm.

The output average duty ratio DUTaveout based on the duty ratio DUT actually used by the actuator drive control unit 258, and the reference average duty ratio DUTaveref corresponding to the reference temperature Tref are used as the average duty ratio DUTave. Accordingly, the average duty ratio DUTave1 of FIG. 17 is one of the output average duty ratios DUTaveaout.

Moreover, the characteristic of FIG. 17 is a characteristic at a time that the drive current Id is falling (or in other words, when loop 2 and loop 3 are alternately executed). In relation to this point, at a time that the drive current Id is rising (or in other words, when loop 1 and loop 3 are alternately executed), the average duty ratio DUTave remains substantially constant irrespective of the internal temperature Tacm. On the other hand, at the time that the drive current Id is falling (or in other words, when loop 2 and loop 3 are alternately executed), the average duty ratio DUTave varies substantially linearly depending on the internal temperature Tacm. Such a feature is considered to occur due to the following reasons.

Specifically, the resistance of the coil 218 varies depending on the internal temperature Tacm. Further, when the internal temperature Tacm rises, the air inside the actuator 210 expands, an air gap between the drive shaft 216 and the coil 218 expands, and the inductance of the coil 218 decreases, resulting in a change in the responsiveness of the actuator 210. Thus, according to the present embodiment, the internal temperature Tacm is estimated using a drive current Id at a time that the drive current Id is falling.

Further, in the case that the internal temperature Tacm is less than Tref, it becomes difficult to approximate the secondary straight line due to the following reasons. Specifically, such a difficulty is considered to be due to the fact that when the internal temperature Tacm is low, the degree of hardening of the rubber plate 214 (FIG. 2) increases, and the ACM generated force Facm is not proportional to the ACM internal temperature Tacm.

(A-2-7-2. Average Duty Ratio DUTave)

FIGS. 18A to 18C are first through third figures for describing the average duty ratio DUTave according to the present embodiment. More specifically, FIG. 18A shows an example of the target current waveform Wi according to the present embodiment. The target current waveform Wi (target current arrangement Mi) shown in FIG. 18A is obtained by performing a zero point correction on the target current waveform Wi of FIG. 11C. FIG. 18B is a diagram showing the voltage duty ratio DUT in the case of using the target current arrangement Mi of FIG. 18A. For this reason, the horizontal axes of FIGS. 18A and 18B are the same. FIG. 18C is an enlarged view of a portion of FIG. 18B.

In the present embodiment, the ECU 206 sets an average of the duty ratios DUT, at a time that the duty ratios DUT range from the first duty ratio threshold value THdut1 to the second duty ratio threshold value THdut2, to the average duty ratio DUTave (i.e., the falling interval average duty ratio DUTavedwn). Hereinafter, the interval when the duty ratios DUT range from the first duty ratio threshold value THdut1 to the second duty ratio threshold value THdut2 will be referred to as a "falling interval average duty ratio calculation target interval Ztar" or simply a "target interval Ztar".

When the falling interval average duty ratio DUTavedwn is calculated, the ECU 206 first calculates a regression line 510 from the duty ratios DUT within the target interval Ztar. In addition, the ECU 206 sets as the falling interval average duty ratio DUTavedwn an average value (DUTmax+DUTmin)/2 of the maximum value DUTmax and the minimum value DUTmin of the regression line 510 in the target interval Ztar.

(A-2-7-3. Outline of Internal Temperature Estimating Unit 260)

Figure 19:
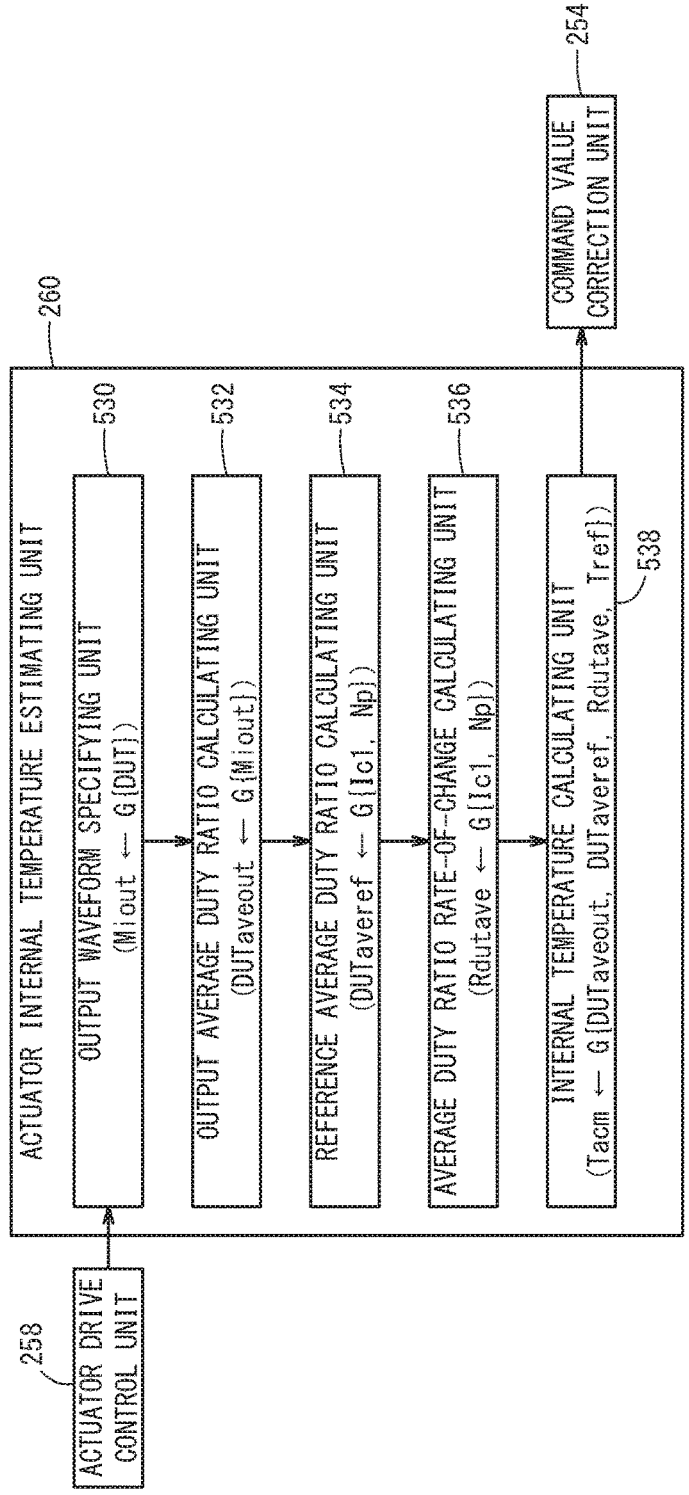
FIG. 19 is a block diagram showing details of an actuator internal temperature estimating unit of the embodiment.

FIG. 19 is a block diagram showing details of the actuator internal temperature estimating unit 260 of the present embodiment. As shown in FIG. 19, the internal temperature estimating unit 260 includes an output waveform specifying unit 530, an output average duty ratio calculating unit 532, a reference average duty ratio calculating unit 534, an average duty ratio rate-of-change calculating unit 536, and an internal temperature calculating unit 538. The respective components of the internal temperature estimating unit 260 shown in FIG. 19 are functional units realized by executing programs stored in the storage unit 224. For this reason, a portion of FIG. 19 is drawn in the form of a flowchart.

(A-2-7-4. Output Waveform Specifying Unit 530)

The output waveform specifying unit 530 acquires each individual duty ratio DUT from the duty ratio calculating unit 362 (FIG. 12) of the drive control unit 258. The duty ratios DUT from the duty ratio calculating unit 362 are values output by performing a PID control on duty ratios DUT corresponding to the target current arrangement Mi. The output waveform specifying unit 530 collects, in the form of an output duty ratio array Miout, the acquired individual duty ratios DUT for each single waveform computation period Pwc.

(A-2-7-5. Output Average Duty Ratio Calculating Unit 532)

On the basis of the output duty ratio array Miout, the output average duty ratio calculating unit 532 calculates the falling interval average duty ratio DUTavedwn as an average value of the duty ratios DUT occurring within the falling current interval Zdwn. As discussed previously, the ECU 206 first calculates the regression line 510 from the duty ratios DUT within the target interval Ztar. In addition, the ECU 206 sets as the falling interval average duty ratio DUTavedwn an average value (DUTmax+DUTmin)/2 of the maximum value DUTmax and the minimum value DUTmin of the regression line 510 in the target interval Ztar.

(A-2-7-6. Reference Average Duty Ratio Calculating unit 534)

Figure 20:
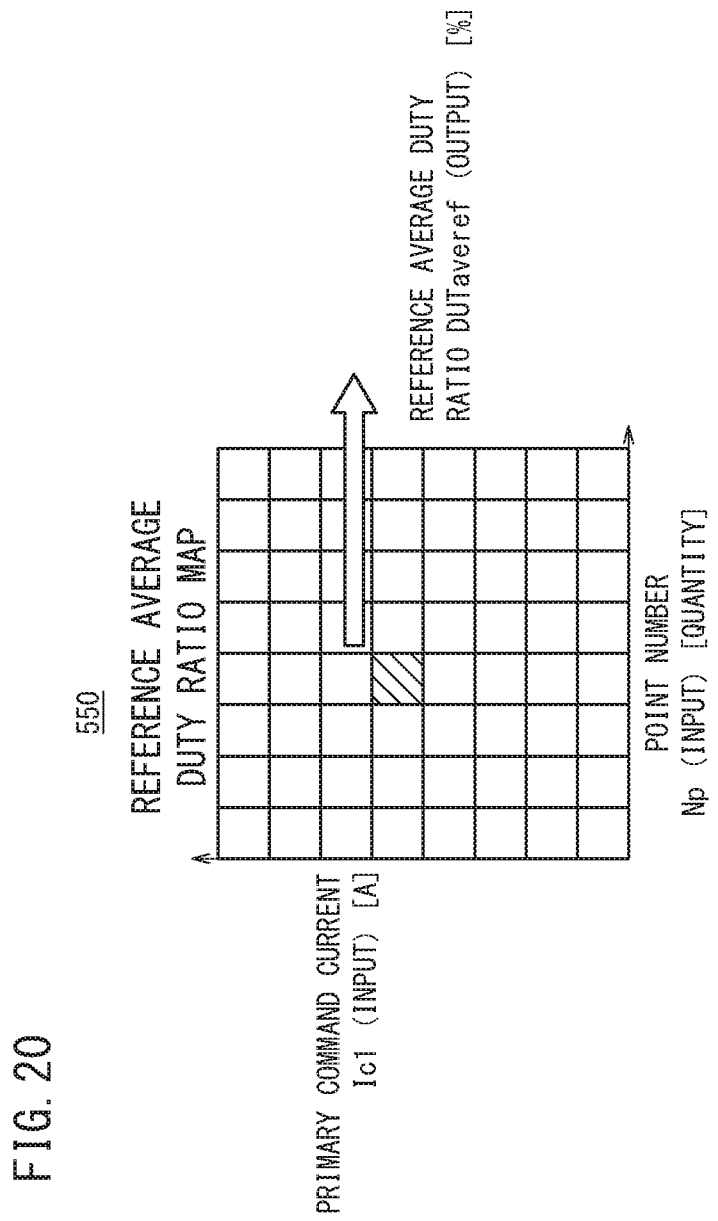
FIG. 20 is a diagram showing a reference average duty ratio map which is used by a reference average duty ratio calculating unit in the embodiment.

The reference average duty ratio calculating unit 534 calculates a reference average duty ratio DUTaveref (see FIG. 17) on the basis of the primary command current Ic1 (see FIG. 5) and the point number Np (see FIGS. 5 and 6). FIG. 20 is a diagram showing a reference average duty ratio map 550 which is used by the reference average duty ratio calculating unit 534 in the present embodiment. The reference average duty ratio map 550 defines a relationship between the reference average duty ratio DUTaveref and a combination of the primary command current Ic1 and the point number Np.

The reference average duty ratio calculating unit 534 reads out from the reference average duty ratio map 550 the reference average duty ratio DUTaveref corresponding to the combination of the primary command current Ic1 and the point number Np. The reference average duty ratio DUTaveref is an average duty ratio DUTave for the purpose of realizing the primary command current Ic1 and the point number Np at the reference temperature Tref (FIG. 17).

FIG. 21 is a diagram showing an example of the relationship between the point number Np and the average duty ratio DUTave in the present embodiment. In FIG. 21, both the case of odd numbered point numbers Np and the case of even numbered point numbers Np are shown. The point number Np is roughly proportional to the inverse (1/Ne) of the engine rotational speed Ne.

As shown in FIG. 21, a relationship between the point number Np and the average duty ratio DUTave is generally divided into two types, for when the point numbers Np are odd numbers and when the point numbers Np are even numbers. Such a feature is considered to be due to the fact that the position of the points shifts between the case in which the point numbers Np are odd numbers and the case in which the point numbers Np are even numbers. Thus, according to the present embodiment, the difference between the case in which the point numbers Np are even numbers and the case in which the point numbers are odd numbers is reflected in the reference average duty ratio map 550 (see FIG. 20). More specifically, the reference average duty ratios DUTaveref are stored in the reference average duty ratio map 550 while discriminating between cases when the point numbers Np are even numbers and when the point numbers Np are odd numbers.

(A-2-7-7. Average Duty Ratio Rate-of-Change Calculating Unit 536)

The average duty ratio rate-of-change calculating unit 536 calculates the average duty ratio rate of change Rdutave (see FIG. 17) on the basis of the primary command current Ic1 (see FIG. 5) and the point number Np (see FIGS. 5 and 6). FIG. 22 is a diagram showing an average duty ratio rate-of-change map 560 which is used by the average duty ratio rate-of-change calculating unit 536 in the present embodiment. The average duty ratio rate-of-change map 560 defines a relationship between the average duty ratio rate of change Rdutave and a combination of the primary command current Ic1 and the point number Np.

The average duty ratio rate-of-change calculating unit 536 reads out from the average duty ratio rate-of-change map 560 an average duty ratio rate of change Rdutave corresponding to the combination of the primary command current Ic1 and the point number Np. As noted previously, the average duty ratio rate of change Rdutave indicates the slope for a case in which the internal temperature-average duty ratio characteristics 500 (FIG. 17) corresponding to the point number Np are presented as a secondary straight line (regression line).

As discussed above, the relationship between the point number Np and the average duty ratio DUTave is generally divided into two types, for when the point numbers Np are odd numbers and when the point numbers Np are even numbers (see FIG. 21). Thus, according to the present embodiment, the difference between the case in which the point numbers Np are even numbers and the case in which the point numbers Np are odd numbers is reflected in the average duty ratio rate-of-change map 560 (see FIG. 22). More specifically, the average duty ratio rates of change Rdutave are stored in the average duty ratio rate-of-change map 560 while discriminating between cases when the point numbers Np are even numbers and when the point numbers Np are odd numbers.

(A-2-7-8. Internal Temperature Calculating Unit 538)

The internal temperature calculating unit 538 calculates the actuator internal temperature Tacm on the basis of the output average duty ratio DUTaveout, the reference average duty ratio DUTaveref, the average duty ratio rate of change Rdutave, and the reference temperature Tref. More specifically, the internal temperature calculating unit 538 calculates the internal temperature Tacm based on the following formula (6).

$$Tacm=(DUTaveout-DUTaveref) \cdot Rdutave+Tref \quad (6)$$

As was described with reference to FIG. 17, formula (6) is premised on the fact that, in the case that the internal temperature Tacm is greater than or equal to the reference temperature Tref, the internal temperature Tacm and the falling interval average duty ratio DUTavedwn for each of the point numbers Np can be approximated by the relationship of the secondary straight line (regression line).

A-3. Advantages and Effects of the Present Embodiment

As has been described above, according to the present embodiment, the following effects can be achieved.

Under conditions in which the period of rotation Pv of the engine 12 (drive source) and the operation command values C remain equal or otherwise unchanged, the output average duty ratio DUTaveout varies in accordance with a difference in the internal temperature Tacm (see FIG. 16). According to the present embodiment, a value obtained by adding the reference temperature Tref to the product of the average duty ratio rate of change Rdutave and the deviation between the output average duty ratio DUTaveout and the reference average duty ratio DUTaveref is calculated as the internal temperature Tacm (refer to formula (6), and the internal temperature calculating unit 538 shown in FIGS. 17 and 19). Since the change in the resistance value inside the actuator 210 (coil 218) is reflected in the voltage duty ratio DUT, the duty ratio enables the internal temperature Tacm to be estimated with high accuracy. Further, even for cases in which it is difficult to arrange an existing temperature sensor (for example, a thermistor or a thermocouple) inside of the actuator 210, or cases in which an existing temperature sensor is arranged outside of the actuator 210 yet the measurement accuracy of the internal temperature Tacm is low, it is still possible to estimate the internal temperature Tacm with high accuracy. Alternatively, by dispensing with an existing type of temperature sensor as described above, it is possible to reduce the size or reduce the cost of the active vibration damping device 200 as a whole. Alternatively, by using the present embodiment while also arranging an existing type of temperature sensor inside of the actuator 210, it is possible to provide a superior configuration from the standpoint of offering a fail-safe system.

In the present embodiment, the ECU 206 (computer) further comprises a reference average duty ratio map 550 (see FIG. 20) in which there are stored in association with each other the reference average duty ratio DUTaveref and a combination of the operation command values C and the point number Np, and an average duty ratio rate-of-change map 560 (see FIG. 22) in which there are stored in association with each other the average duty ratio rate of change Rdutave and the combination of the operation command values C and the point number Np. Further, in the ECU 206, the reference average duty ratio map 550 and the average duty ratio rate-of-change map 560 each define different relationships for a case in which the point number Np is an odd number and a case in which the point number Np is an even number (see FIG. 21).

In certain cases, the correlation between the average duty ratio DUTave and the internal temperature Tacm differs between the case in which the point number Np (an integer value which is set so as to increase as the period of rotation Pv of the engine 12 increases) is an odd number and the case in which the point number Np is an even number (see FIG. 21). The reference average duty ratio map 550 and the average duty ratio rate-of-change map 560 have different relationships defined therein for the case in which the point number Np is an odd number and the case in which the point number Np is an even number. Therefore, it is possible to estimate the internal temperature Tacm with high accuracy.

The reference average duty ratio calculating unit 534 and the average duty ratio rate-of-change calculating unit 536 calculate the reference average duty ratio DUTaveref and the average duty ratio rate of change Rdutave, which differ between a case in which the point number Np is an even number and a case in which the point number Np is an odd number (see FIG. 21). In accordance with this feature, for the same reasons as mentioned above, it is possible to estimate the internal temperature Tacm with high accuracy.

In the present embodiment, the estimation of the internal temperature Tacm performed by the internal temperature estimating unit 260 (internal temperature estimating step) includes the steps of calculating the output average duty ratio DUTaveout (output average duty ratio calculating step), calculating the reference average duty ratio DUTaveref (reference average duty ratio calculating step), and calculating the internal temperature Tacm (internal temperature calculating step) (see FIG. 19). In the output average duty ratio calculating step, the output average duty ratio DUTaveout, which is the average of the duty ratios DUT that are used for realizing the operation command values C in the drive control step, is calculated (in the output average duty ratio calculating unit 532 of FIG. 19), in accordance with the point number Np (or stated otherwise, when the period of rotation Pv of the engine 12 (drive source) is the predetermined period). In the reference average duty ratio calculating step, the reference average duty ratio DUTaveref, which is the average of the duty ratios DUT that realize the operation command values C when the internal temperature Tacm is the reference temperature Tref and in accordance with the point number Np (or stated otherwise, when the period of rotation Pv of the engine 12 is the predetermined period), is calculated (in the reference average duty ratio calculating unit 534 of FIG. 19) based on the operation command values C and the point number Np. In the internal temperature calculating step, the internal temperature Tacm is calculated on the basis of the deviation between the reference average duty ratio DUTaveref and the output average duty ratio DUTaveout (refer to formula (6), and the internal temperature calculating unit 538 of FIGS. 17 and 19).

Under conditions in which the point number Np (or the period of rotation Pv of the engine 12) and the operation command values C remain equal or otherwise unchanged, the output average duty ratio DUTaveout varies in accordance with a difference in the internal temperature Tacm (see FIG. 17). According to the present embodiment, the internal temperature Tacm of the actuator 210 is estimated on the basis of a deviation between the reference average duty ratio DUTaveref and the output average duty ratio DUTaveout. Therefore, even for cases in which it is difficult to arrange an existing temperature sensor (for example, a thermistor or a thermocouple) inside of the actuator 210, or cases in which an existing temperature sensor is arranged outside of the actuator 210 yet the measurement accuracy of the internal temperature Tacm is low, it is still possible to estimate the internal temperature Tacm with high accuracy. Alternatively, by dispensing with an existing type of temperature sensor as described above, it is possible to reduce the size or reduce the cost of the active vibration damping device 200 as a whole. Alternatively, by using the present embodiment while also arranging an existing type of temperature sensor inside of the actuator 210, it is possible to provide a superior configuration from the standpoint of offering a fail-safe system.

B. MODIFICATIONS

The present invention is not limited to the above embodiment, and various arrangements may be adopted therein based on the content of the present description. For example, the present invention may adopt the following modified arrangements.

B-1. Object to which the Invention is Applied

In the above-described embodiment, the active vibration damping device 200 (ACM ECU 206) is applied to the vehicle 10 which is an engine vehicle that does not include a traction motor (see FIG. 1). However, for example, insofar as attention is focused on estimating the ACM internal temperature Tacm, the present invention is not limited to this feature. For example, the active vibration damping device 200 may be used in another vehicle 10 such as a hybrid vehicle having a traction motor in addition to the engine 12. Alternatively, the object to which the active vibration damping device 200 is applied is not limited to the vehicle 10, and another type of mobile object (such as a ship, aircraft, etc.) equipped with a rotary drive source such as the engine 12 or the like can be used.

Alternatively, the active vibration damping device 200 may be applied to manufacturing equipment, a robot, or a home appliance that is equipped with a rotary drive source such as the engine 12.

B-2. Engine 12 (Drive Source)

In the above-described embodiment, the engine 12 is used for the purpose of driving (to generate the drive force for the vehicle 10). However, for example, in the event that the vehicle 10 includes a traction motor as a drive force generating means, the engine 12 may be used solely for the purpose of operating a non-illustrated electric generator.

B-3. Battery 16 (Power Storage Device)

In the above-described embodiment, the battery 16, which is a 12V battery, is used as a power storage device that supplies electric power to the actuator 210 (see FIG. 1). However, electric power may be supplied to the actuator 210 by another power storage device. As the other power storage device, for example, a battery having a voltage higher than 12 volts (for example, a battery for a traction motor) or a capacitor can be used.

B-4. ACM ECU 206

[B-4-1. Configuration]

In the above embodiment, the drive circuit 364 makes up a portion of the ACM ECU 206 (see FIGS. 12 and 14). However, for example, from the standpoint of driving the actuator 210, the present invention is not limited to this feature. For example, the drive circuit 364 can be arranged inside the actuator 210.

[B-4-2. Control]

(B-4-2-1. Drive Source Rotation Information)

In the above-described embodiment, the vibration amplitude Av and the vibration period Pv (a value proportional to the reciprocal of the engine rotational speed Ne) are used as rotation information of the engine 12 (drive source) (see FIG. 3, etc.). However, for example, from the standpoint of generating canceling vibrations by way of the actuator 210, the invention is not limited to this feature. For example, a time derivative value of the engine rotational speed Ne (i.e., the engine rotational acceleration [rpm/s]) or a value corresponding thereto can be used.

(B-4-2-2. Estimation of Internal Temperature Tacm)

In the above-described embodiment, a value obtained by adding the reference temperature Tref to the product of the average duty ratio rate of change Rdutave and the deviation between the output average duty ratio DUTaveout and the reference average duty ratio DUTaveref was taken as the internal temperature Tacm (refer to formula (6), and the internal temperature calculating unit 538 shown in FIGS. 17 and 19). Stated otherwise, in the above-described embodiment, the internal temperature Tacm was estimated using the secondary straight line (or the regression line). However, for example, from the standpoint of estimating the ACM internal temperature Tacm from the deviation between the output average duty ratio DUTaveout and the reference average duty ratio DUTaveref, the present invention is not limited to this feature.

For example, it is possible to estimate the ACM internal temperature Tacm by a quadratic curve or another nonlinear characteristic. In the case of using a nonlinear characteristic, the relationship between the vibration amplitude Av, the point number Np (or the vibration period Pv), the output average duty ratio DUTaveout, the reference average duty ratio DUTaveref, and the ACM internal temperature Tacm may be stored in advance in the storage unit 224.

In the above-described embodiment, the internal temperature-average duty ratio characteristics 500 (500*a* to 500*c*) are specified on the basis of the point number Np (see FIGS. 17 and 19). However, for example, from the standpoint of specifying the characteristics 500, the invention is not limited to this feature. For example, instead of the point number Np, the vibration period Pv can be used.

(B-4-2-3. Average Duty Ratio DUTave (Predetermined Interval of Computation Period))

In the above-described embodiment, the interval of the duty ratio DUT, which serves as the calculation target of the average duty ratio DUTave, is set only to the target interval Ztar, which is a portion of the falling current interval Zdwn (see FIGS. 18A to 18C). However, it is also possible to include all or a portion of the rising current interval Zup in the target interval Ztar.

In the above-described embodiment, it is assumed that the output average duty ratio DUTaveout is calculated on the basis of the voltage duty ratio DUT as a target value (FIG. 18C). However, for example, from the standpoint of calculating the average of the duty ratio DUT, which is used to realize the operation command values C, an actual measured value of the duty ratio DUT (for example, as calculated based on the output of a voltage sensor (not shown)) can also be used.

B-5. Other Considerations

In the above-described embodiment, the respective calculations (or steps) were executed in the order shown in FIGS. 3 to 5, 7, 8, 12, and 19. However, for example, insofar as the goal of each of such operations (or steps) can be realized (or in other words, in the case that the effects of the present invention can be obtained), the order of the operations can be interchanged. For example, in FIG. 19, it is possible to exchange the order in which the output average duty ratio DUTaveout, the reference average duty ratio DUTaveref, and the average duty ratio rate of change Rdutave are calculated, or to calculate them simultaneously.

In the above-described respective embodiments, cases exist in which an equal sign is included or not included in the numerical comparisons. However, for example, if there is no special reason for including or excluding such an equal sign (or stated otherwise, for cases in which the effects of the present invention are obtained), it can be set arbitrarily as to whether to include an equal sign in the numerical comparisons.

As to what this implies, for example, the determination (Tex≥THtex) as to whether or not the outside air temperature Tex in the outside air temperature determining unit 310 of FIG. 7 is greater than or equal to the outside air temperature threshold value THtex can be changed to a determination (Tex>THtex) as to whether or not the outside air temperature Tex is greater than the outside air temperature threshold value THtex.

C. DESCRIPTION OF REFERENCE CHARACTERS

12 . . . engine (drive source)
14 . . . vehicle body
200 . . . active vibration damping device
206 . . . ACM ECU (computer)
210 . . . actuator
252 . . . command value calculating unit
254 . . . command value correction unit
258 . . . actuator drive control unit
260 . . . actuator internal temperature estimating unit
288 . . . point number calculating unit
532 . . . output average duty ratio calculating unit
534 . . . reference average duty ratio calculating unit
536 . . . average duty ratio rate-of-change calculating unit
538 . . . internal temperature calculating unit
550 . . . reference average duty ratio map
560 . . . average duty ratio rate-of-change map
Av . . . engine vibration amplitude (rotation information)
C . . . operation command values
DUT . . . voltage duty ratio
DUTaveout . . . output average duty ratio
DUTaveref . . . reference average duty ratio
Ic1 . . . primary command current (operation command value)
Ic2 . . . secondary command current (operation command value)
Np . . . point number
Pc1 . . . primary phase (operation command value)
Pc2 . . . secondary phase (operation command value)
Pv . . . engine vibration period (rotation information, period of rotation)
Rdutave . . . average duty ratio rate of change
Tacm . . . actuator internal temperature
Tref . . . reference temperature
Vd . . . drive voltage

What is claimed is:

1. An active vibration damping device, comprising:
an actuator disposed between a drive source and a vehicle body; and
a computer configured to suppress transmission of vibrations from the drive source to the vehicle body by causing the actuator to actively generate vibrations;
wherein the computer comprises:
an internal temperature estimating unit configured to calculate an internal temperature of the actuator;
a command value calculating unit configured to calculate an operation command value for the actuator from rotation information of the drive source;
a command value correction unit configured to correct the operation command value in accordance with the internal temperature;
a drive control unit configured to apply a drive voltage to the actuator using a voltage duty ratio based on the corrected operation command value; and
a point number calculating unit configured to obtain an integer value point number which is set so as to become larger as a period of rotation of the drive source becomes longer; and
wherein the internal temperature estimating unit comprises:
an output average duty ratio calculating unit configured to calculate an output average duty ratio, which is an average of target values or actually measured values of the voltage duty ratios that are used for realizing the operation command value, when the period of rotation of the drive source is a predetermined period;
a reference average duty ratio calculating unit configured to calculate, on basis of the operation command value and the point number, a reference average duty ratio, which is an average of the voltage duty ratios that realize the operation command value when the internal temperature is a reference temperature and the period of rotation of the drive source is the predetermined period;
an average duty ratio rate-of-change calculating unit configured to calculate, from the operation command value and the point number, an average duty ratio rate of change, which indicates a relationship between an amount of change of the internal temperature and an amount of change of an average duty ratio which is an average of the voltage duty ratios, when the period of rotation of the drive source is the predetermined period; and
an internal temperature calculating unit configured to calculate as the internal temperature a value obtained by adding the reference temperature to a product of the average duty ratio rate of change and a deviation between the output average duty ratio and the reference average duty ratio.

2. The active vibration damping device according to claim 1, wherein the computer further comprises:
a reference average duty ratio map in which there are stored in association with each other the reference average duty ratio and a combination of the operation command value and the point number; and
an average duty ratio rate-of-change map in which there are stored in association with each other the average duty ratio rate of change and the combination of the operation command value and the point number;
wherein the reference average duty ratio map and the average duty ratio rate-of-change map each define different relationships for a case in which the point number is an odd number and a case in which the point number is an even number.

3. The active vibration damping device according to claim 1, wherein the reference average duty ratio calculating unit and the average duty ratio rate-of-change calculating unit calculate the reference average duty ratio and the average duty ratio rate of change, which differ between a case in which the point number is an even number and a case in which the point number is an odd number.

4. An active vibration damping method using an active vibration damping device, comprising:
- an actuator disposed between a drive source and a vehicle body; and
- a computer configured to suppress transmission of vibrations from the drive source to the vehicle body by causing the actuator to actively generate vibrations;
- wherein the computer executes:
- an internal temperature estimating step of estimating an internal temperature of the actuator;
- a command value calculating step of calculating an operation command value for the actuator from rotation information of the drive source;
- a command value correction step of correcting the operation command value in accordance with the internal temperature;
- a drive control step of applying a drive voltage to the actuator using a voltage duty ratio based on the corrected operation command value; and
- a point number calculating step of obtaining an integer value point number which is set so as to become larger as a period of rotation of the drive source becomes longer; and
- wherein the internal temperature estimating step includes:
- an output average duty ratio calculating step of calculating an output average duty ratio, which is an average of target values or actually measured values of the voltage duty ratios that are used for realizing the operation command value in the drive control step, when the period of rotation of the drive source is a predetermined period;
- a reference average duty ratio calculating step of calculating, on basis of the operation command value and the point number, a reference average duty ratio, which is an average of the voltage duty ratios that realize the operation command value when the internal temperature is a reference temperature and the period of rotation of the drive source is the predetermined period; and
- an internal temperature calculating step of calculating the internal temperature on basis of a deviation between the output average duty ratio and the reference average duty ratio.

* * * * *